US012221835B1

(12) United States Patent
Cipperley et al.

(10) Patent No.: US 12,221,835 B1
(45) Date of Patent: Feb. 11, 2025

(54) DOWNHOLE REAMER WITH ROTATING SLEEVE

(71) Applicant: DRC Drilling Solutions LLC, Midland, TX (US)

(72) Inventors: Corey Cipperley, Midland, TX (US); Erin Venables, Hinton (CA); Pete Vanderveen, Phoenix, AZ (US)

( * ) Notice: Subject to any disclaimer, the term of this patent is extended or adjusted under 35 U.S.C. 154(b) by 0 days.

(21) Appl. No.: 18/388,247

(22) Filed: Nov. 9, 2023

(51) Int. Cl.
*E21B 10/26* (2006.01)
*E21B 4/02* (2006.01)
*E21B 17/18* (2006.01)
*F03B 13/02* (2006.01)

(52) U.S. Cl.
CPC ................ *E21B 10/26* (2013.01); *E21B 4/02* (2013.01); *E21B 17/18* (2013.01); *F03B 13/02* (2013.01)

(58) Field of Classification Search
CPC ......... E21B 43/38; E21B 43/088; E21B 33/12
See application file for complete search history.

(56) References Cited

U.S. PATENT DOCUMENTS 5,098,258 A * 3/1992 Barnetche-Gonzalez .................. E21B 4/02 415/75
6,527,513 B1 3/2003 Van Drentham-SuSman
8,752,649 B2 6/2014 Isenhour
9,163,460 B2 10/2015 Isenhour
10,676,992 B2 6/2020 Pearson
11,299,936 B2 4/2022 Harvey
11,408,230 B2 8/2022 Aschenbrenner
2011/0315451 A1 12/2011 Scott
2013/0180779 A1 7/2013 Isenhour
2014/0064646 A1 3/2014 Meier
2016/0208559 A1 7/2016 Isenhour
2018/0230758 A1* 8/2018 Nelson .................. E21B 17/043
2018/0274297 A1* 9/2018 Pearson ..................... F03C 2/08
2021/0189803 A1* 6/2021 MacKay ................. E21B 10/22

FOREIGN PATENT DOCUMENTS

AU 2012318698 B2 4/2013
CN 113006696 A * 6/2021 ............... E21B 4/02
EP 0 568 723 A1 11/1993

OTHER PUBLICATIONS

English Translation of Zhang et al. CN-113006696-A (Year: 2024).*
Steven Duplantis, Slide Drilling—Farther and Faster, May 2016, Oilfield Review, Houston, TX USA, Oilfield Review 28, No. 2, https://www.slb.com/-/media/files/oilfield-review/04-slide-drilling-english.ashx (last accessed Nov. 7, 2023).
Superior Drilling Products, Inc., Drill-N-Ream, SDPI.com, Vernal, UT USA, https://www.sdpi.com/DrillNReam (last accessed Nov. 7, 2023).

(Continued)

*Primary Examiner* — Caroline N Butcher
(74) *Attorney, Agent, or Firm* — Compton & Associates PLLC; Matthew Compton

(57) ABSTRACT

A drill string reaming tool for reaming a wellbore while drilling as part of the bottom hole assembly on a drill string comprises a reaming sleeve having teeth or cutters thereon. In some embodiments, the reaming sleeve rotates around the longitudinal axis of the tool unpowered. In some embodiments, the rotation of the reaming sleeve is powered by a turbine driven by mud flowing through the drill string.

17 Claims, 22 Drawing Sheets

(56) References Cited

OTHER PUBLICATIONS

Dynomax Drilling Tools Inc., Slide Reamers, dynomaxdrillingtools.com, Alberta, CA, https://www.dynomaxdrillingtools.com/ (last accessed Nov. 7, 2023).
InFocus Energy Services Inc., HSRT Family (High Speed Reaming Tool), infocusenergy.com, Edmonton, CA, https://www.infocusenergy.com/hsrt (last accessed Nov. 7, 2023).
Innovex-inc.com, GunDRILL Reamers, innovex-inc.com, Houston, TX USA, https://www.innovex-inc.com/our-products/drilling/reamers-stabilizers/gundrill-reamers/ (last accessed Nov. 7, 2023).

* cited by examiner

DOWNHOLE REAMER WITH ROTATING SLEEVE

FIELD OF THE INVENTION

The present invention generally relates to the field of downhole reamers for drill strings.

BACKGROUND OF THE INVENTION

In many well bore construction cases, there exists a need for a secondary tool run to "ream" or clean the well bore after drilling. Previous solutions create a large financial impact of time and associated costs of needing to run in hole a second time to create an appropriately sized and cleaned hole. Other technologies have been limited in their ability to clean the hole during drilling as many tools have undesired impacts on the equipment used to measure and locate the well, as well as other effects including changes to downhole pressures and reduced flow for hole cleaning.

Current technologies also pose a significant risk of becoming stuck downhole, and have issues with enabling weight transfer to the bit while slide drilling. Existing tools may also impair the ability to retrieve tools further down the drill string. Consequently, there is a demand for an improved tool which does not affect the pressure, flow, or retrievability of the bottom hole assembly components, reduces the chances of differential sticking, and/or facilitates cleaning and conditioning of the well bore.

SUMMARY OF THE INVENTION

One embodiment of a downhole drill string reaming tool comprises a lower housing, a tension mandrel for connection to the lower housing, an interior passageway along the center of the longitudinal axis of the tool, the passageway spanning the lower housing and the tension mandrel, a rotating sleeve comprising one or more blades, and a mud turbine for rotating the rotating sleeve. The mud turbine may be integral with the rotating sleeve. In some embodiments the mud turbine may be directly connected to the rotating sleeve. The reaming tool may also have radial bearings for supporting a radial load of the sleeve. An axial thrust bearing between the sleeve and the lower housing for supporting an axial load of the sleeve may be present. An axial thrust bearing may be between the sleeve and the tension mandrel for supporting an axial load of the sleeve may also be present in some embodiments. The reaming tool may have a tension mandrel with an inlet for mud to flow from the interior passageway towards a mud turbine blade. Spring-loaded anti-rotation teeth for restricting a direction of rotation of the rotating sleeve may also be present in some embodiments.

Another embodiment of a downhole drill string reaming tool comprises a lower housing, a tension mandrel for connection to the lower housing, an interior passageway along the center of the longitudinal axis of the tool, the passageway spanning the lower housing and the tension mandrel, and at least a first and a second rotating sleeve, each sleeve comprising one or more blades. At least one mud turbine for rotating one of the at least two rotating sleeves may be present. The reamer may have a first and a second mud turbine, said first mud turbine for rotating the first sleeve and the second mud turbine for rotating the second sleeve. The reamer may also have at least one axial load bearing between the first and second sleeve, facilitating the rotation of the first sleeve against the second sleeve. In some embodiments, the tension mandrel has an inlet for mud to flow from the interior passageway towards a mud turbine blade of the first mud turbine. In some embodiments, the tension mandrel comprises a bypass for mud to flow from a turbine blade of the second mud turbine into the interior passageway.

Yet another embodiment of a downhole drill string reaming tool comprises a lower housing, a tension mandrel for connection to the lower housing, an interior passageway along the center of the longitudinal axis of the tool, the passageway spanning the lower housing and the tension mandrel, and at least a first and a second rotating sleeve, each sleeve comprising one or more blades, and a spacer between the first and second rotating sleeves. The reamer may have at least one mud turbine for rotating one of the at least two rotating sleeves. The reamer may have a first and a second mud turbine, said first mud turbine for rotating the first sleeve and the second mud turbine for rotating the second sleeve. The reamer may also have at least one axial load bearing between the first sleeve and the spacer, for facilitating the rotation of the first sleeve against the spacer. In some embodiments, the reamer may have at least one axial load bearing between the second sleeve and the spacer, for facilitating the rotation of the second sleeve against the spacer. In some embodiments, the tension mandrel comprises a bypass for mud to flow from a turbine blade of the second mud turbine into the interior passageway.

One method of reaming a wellbore may comprise the steps of providing a reaming tool having an interior passageway along the center of the longitudinal axis of the reaming tool, pumping mud to power a mud turbine on the reaming tool, the mud turbine thereby rotating a rotatable sleeve on the reaming tool, and reaming the wellbore with one or more blades on the rotatable sleeve. In some situations, an additional step may include pumping a cable and latch downhole through the interior passageway of the reaming tool. Restricting the sleeve from rotating in one direction by utilizing spring-loaded anti-rotation teeth may also be done in some circumstances.

In some embodiments, the reaming tool used in reaming comprises an axial thrust bearing between the rotatable sleeve and a second rotatable sleeve comprising one or more blades. The mud turbine may in some circumstances be integral with the rotatable sleeve. In other situations, the mud turbine may be directly connected to the rotatable sleeve. The reaming tool used in reaming may have radial bearings for supporting a radial load of the rotatable sleeve. The reaming tool used in reaming may have an axial thrust bearing between the rotatable sleeve and a lower housing of the reaming tool, the bearing for supporting an axial load of the sleeve. The reaming tool may have an axial thrust bearing between the sleeve and a tension mandrel of the reaming tool, the bearing for supporting an axial load of the sleeve. The reaming tool may have a tension mandrel with an inlet for the pumped mud to flow from the interior passageway towards a blade of the mud turbine.

DETAILED DESCRIPTION

Various embodiments of the present invention are herein described with reference to the attached figures. The figures are not drawn to scale. Several aspects of embodiments of the invention are described below. It should be understood that numerous specific details, relationships, and methods are set forth to provide an understanding of the invention. One skilled in the relevant art, however, will readily recognize that the invention can be practiced without one or more of the specific details or with other methods.

Figure 1:
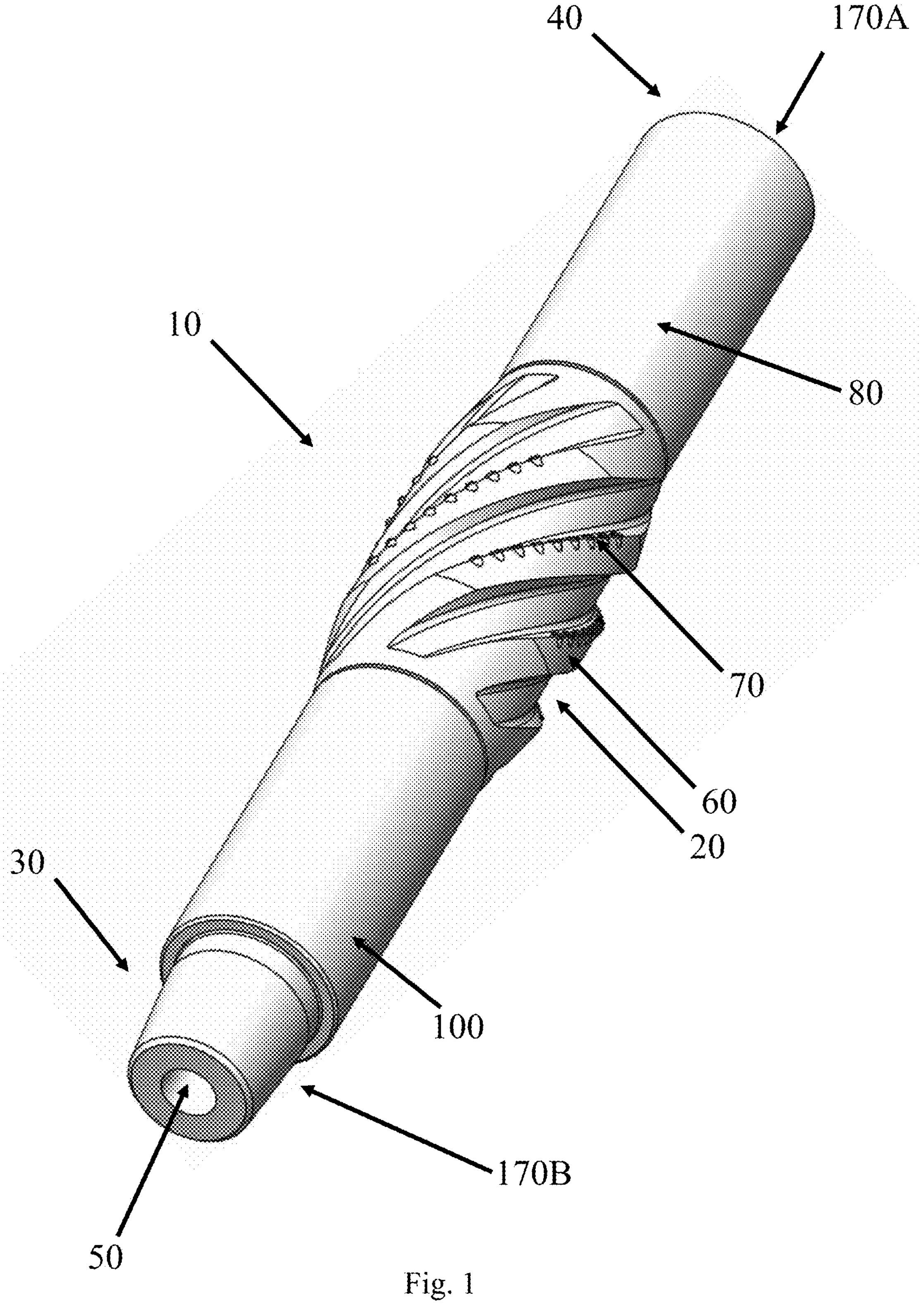
FIG. 1 is a perspective view of an embodiment of a downhole reaming tool with one sleeve.

FIG. 1 is a perspective view of a downhole reaming tool, in this case, a reamer 10 having a downhole end 30 and an uphole end 40 with a interior passageway 50 along the longitudinal axis of the reamer. The reamer 10 has a lower housing 100 and a tension mandrel 80 and a rotating sleeve 20. The sleeve has reamer blades 60 with teeth 70 or cutters such as polycrystalline diamond compact (PDC) cutters. The blades in some embodiments are replaceable so as to facilitate the adjustment of hole gauge diameter on-the-fly.

At the uphole end 40 and the downhole end 30 and of the tool are, in a preferred embodiment, API (American Petroleum Institute) connections 170A and 170B respectively to run the tool in the drill string. API connections are drill string connections defined by the American Petroleum Institute and include such connections designated as Numbered Connections (NC), Full Hole (FH), API Regular, PAC (Pacific Asia Connection), OH, SL, H-90, and so forth. Other connections, including non-API connections, may be used as desired or appropriate.

FIGS. 2-5 are various cutaway and perspective views of embodiments of a downhole reaming tool with a single sleeve. The uphole end 40 and the downhole end 30 of the tool have, in a preferred embodiment, API connections 170A and 170B respectively. The uphole end 40 is part of the tension mandrel 80. The downhole end 30 is part of the lower housing 100. A threaded connection 90 joins the tension mandrel 80 to the lower housing 100. Thread relief 91 may be present in some embodiments.

At the uphole end 40 an axial thrust bearing housing 140A holds upper axial thrust bearings (not shown). The upper axial bearings support the axial load of the sleeve 20 and thus facilitate rotation of the sleeve 20 by reducing the binding effect of forces compressing the sleeve 20 into the tension mandrel 80 during operation of the reamer. Likewise at the downhole end 30, an axial thrust bearing housing 140B holds lower axial thrust bearings (not shown). The lower axial bearings support the axial load of the sleeve 20 and thus facilitate rotation of the sleeve 20 by reducing the binding effect of forces compressing the sleeve 20 into the lower housing 100 during operation of the reamer.

Figure 7:
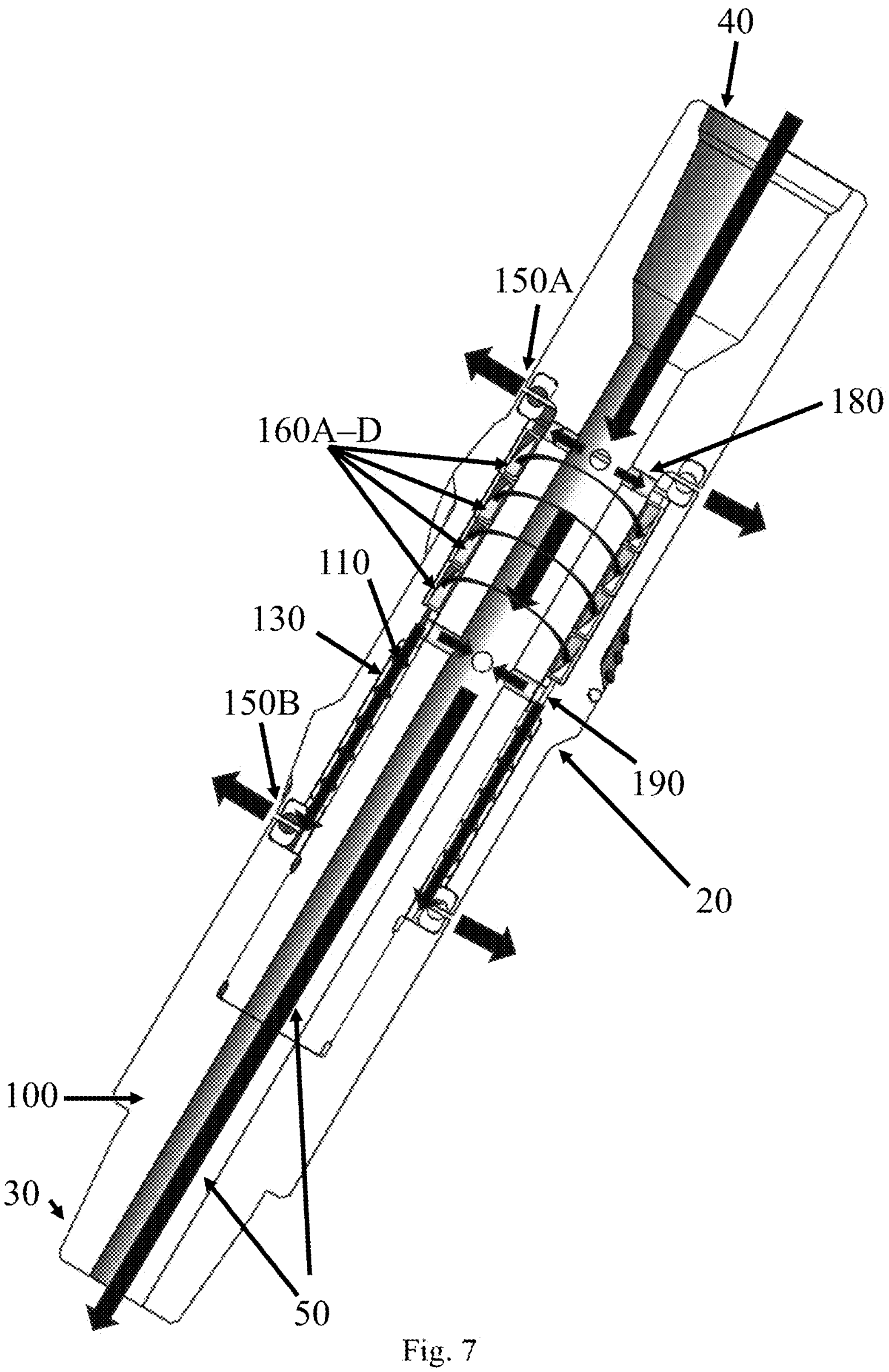
FIG. 7 is a perspective cross-sectional view of an embodiment of a downhole reaming tool with a mud flow diagram.

Mud flow is addressed at greater length with respect to FIG. 7. To touch on the subject of mud flow in part, with respect to FIGS. 2-5, the interior passageway 50 allows for mud to be pumped through the tool from the uphole end 40 to the downhole end 30. The interior passageway 50 portion of the tension mandrel 80 has mud inlets 180. The mud inlets 180 permit mud to flow into the axial thrust bearing housing 140A to lubricate and/or cool the axial thrust bearing. Some portion of the pumped mud may escape from the mud outlet 150A.

A portion of the mud may also flow from the mud inlets 180 into a mud turbine 160 having several mud turbine channels 160A-D. The mud turbine 160 may be connected to the sleeve 20, for example by welding or bolts, or in some embodiments, the mud turbine in an integral part of the sleeve 20. The flow of the mud through the mud turbine channels 160A-D causes the turbine 160, and thus the sleeve 20, to rotate around the longitudinal axis of the tool. This mud-powered rotation facilitates the reaming of a bore hole by the cutters or teeth 70.

Radial bearings (not shown) may be present in a radial bearing cavity 120 that is part of a radial bearing housing 130. The radial bearings support the radial load of the sleeve 20 and thus facilitate the rotation of the sleeve 20 around the tension mandrel 80 during operation. In some embodiments the tension mandrel 80 is short enough such that the sleeve rotates only around the lower housing 100. In other embodiments, the tension mandrel 80 is long enough so that the sleeve rotates around both the tension mandrel 80 and the lower housing 100, and in such a case the lower housing may be profiled so as to permit the sleeve to overlap a portion, or the sleeve may have a lip extending over the lower housing.

After passing through the mud turbine 160, some of the mud may exit back into the interior passageway 50 by way of the mud return/bypass outlets 190 and rejoin the mud flowing through the tool. Some of the mud may travel instead through a mud passage 110 and into the bearing cavities (e.g., item 120) to lubricate and/or cool the radial bearings in the radial bearing housing 130. Thereafter, mud may flow from the radial bearing housing 130 into the lower axial thrust bearing housing to cool and/or lubricate the lower radial thrust bearing in the lower radial thrust bearing housing 140B. Thereafter, mud may exit the tool through the lower mud outlet 150B.

Figure 6:
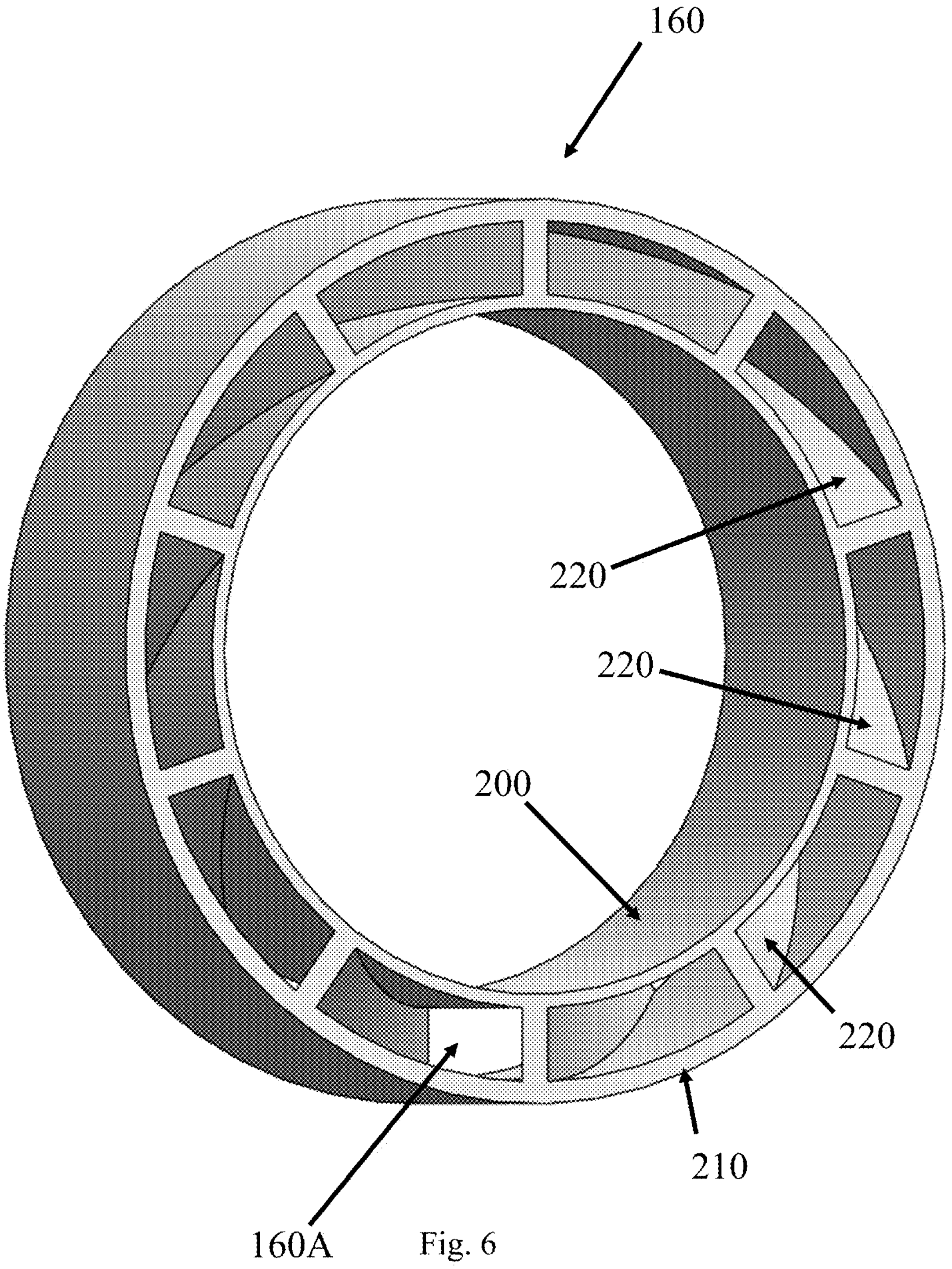
FIG. 6 is a perspective cutaway view of an embodiment of a mud turbine.
Figure 6A:
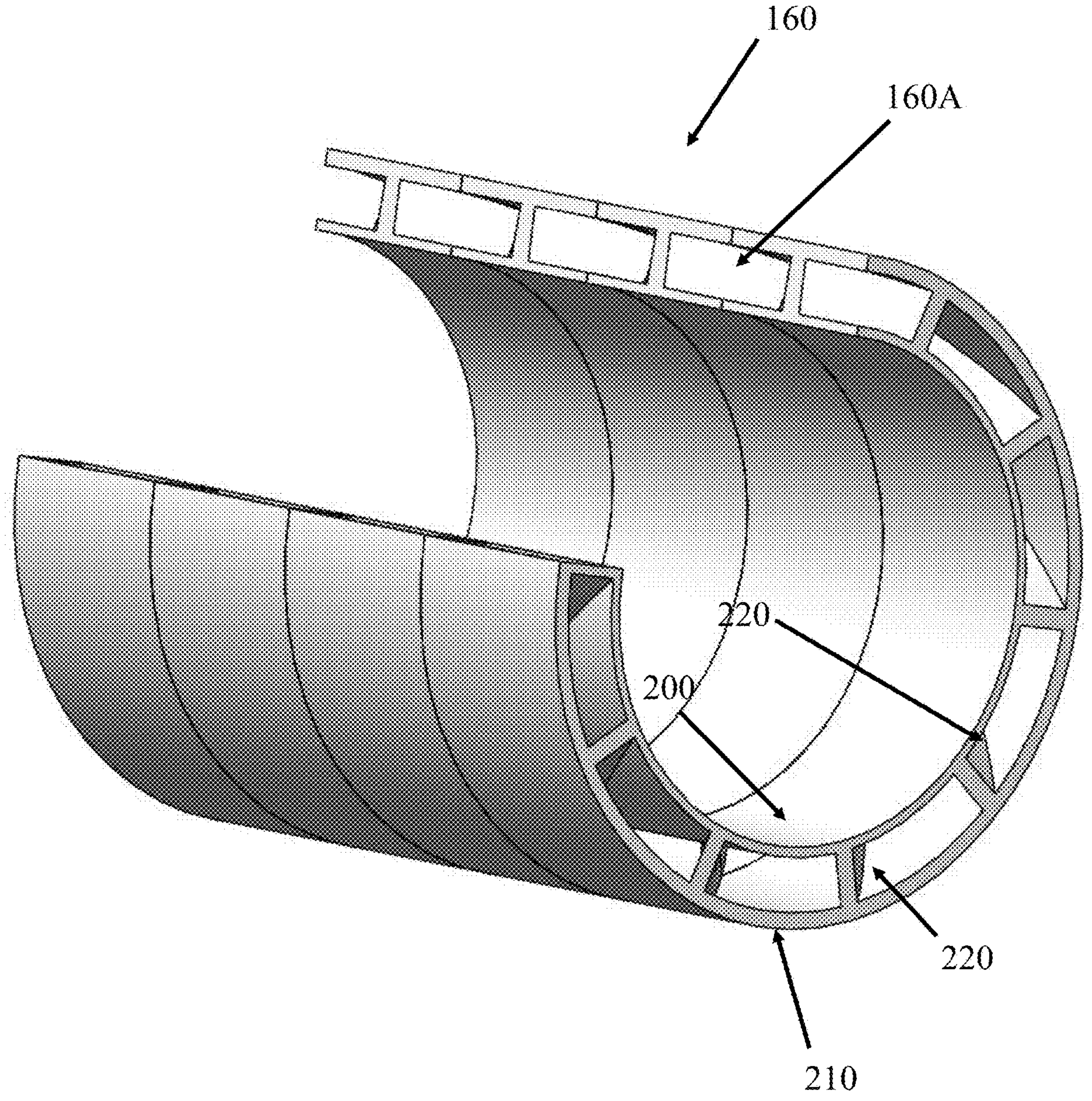
FIG. 6A is a perspective section view of an embodiment of a mud turbine.

FIGS. 6 and 6A are a perspective cutaway views of an embodiment of a mud turbine 160. The mud turbine 160 has an inner rim 200, in some embodiments an outer rim 210, and at least one turbine blade 220. The turbine blades 220 define mud turbine channels (e.g., 160A) that provide a path for mud to flow through and thus cause rotation of the mud turbine 160. The outer rim 210 may in some cases be present if the mud turbine is welded or bolted to the sleeve 20. Where the mud turbine is integral with the sleeve 20 the outer rim might not be present.

FIG. 7 is a perspective view of an embodiment of a downhole reaming tool with a mud flow diagram. As discussed above, mud may be pumped by a mud pump (not shown) through a drill string. When installed on a drill string, the reaming tool permits passage of the pumped mud from the upper end 40 to the lower end 30. The mud is pressurized by the mud pump and gravitational forces and pumped in such large volumes that the flow of mud may be used as a downhole power source.

The interior passageway 50 portion of the tension mandrel 80 has mud inlets 180 that allow mud to pass through the tension mandrel. The mud inlets 180 permit mud to flow into a mud path that may include an axial thrust bearing housing 140A, allowing for the flow of mud to lubricate and/or cool the axial thrust bearing. Some portion of the pumped mud that enters the mud inlets 180 may pass through the axial thrust bearing housing 140A and escape from the mud outlets 150A-B.

Some portion of the pumped mud that enters the mud inlets 180 may pass through the mud turbine 160. The mud turbine 160 has several mud turbine channels 160A-D. The mud turbine 160 may be connected to the sleeve 20, for example by welding or bolts, or in some embodiments, the mud turbine in an integral part of the sleeve 20. The flow of the mud through the mud turbine channels 160A-D causes the turbine 160, and thus the sleeve 20, to rotate around the longitudinal axis of the tool. This mud-powered rotation facilitates the reaming of a bore hole by the cutters or teeth 70 on the sleeve 20.

After passing through the mud turbine 160, some of the pumped mud may exit back into the interior passageway 50 by way of the mud return/bypass outlets 190 and rejoin the mud flowing through the tool. Some of the mud, having passed through the mud turbine 160 may travel instead through a mud passage 110 and into the bearing cavities (e.g., item 120) to lubricate and/or cool the radial bearings in the radial bearing housing 130. Thereafter, the mud may flow from the radial bearing housing 130 into the lower axial thrust bearing housing to cool and/or lubricate the lower radial thrust bearing in the lower radial thrust bearing housing 140B. Thereafter, mud may exit the tool through the lower mud outlet 150B.

Figure 8:
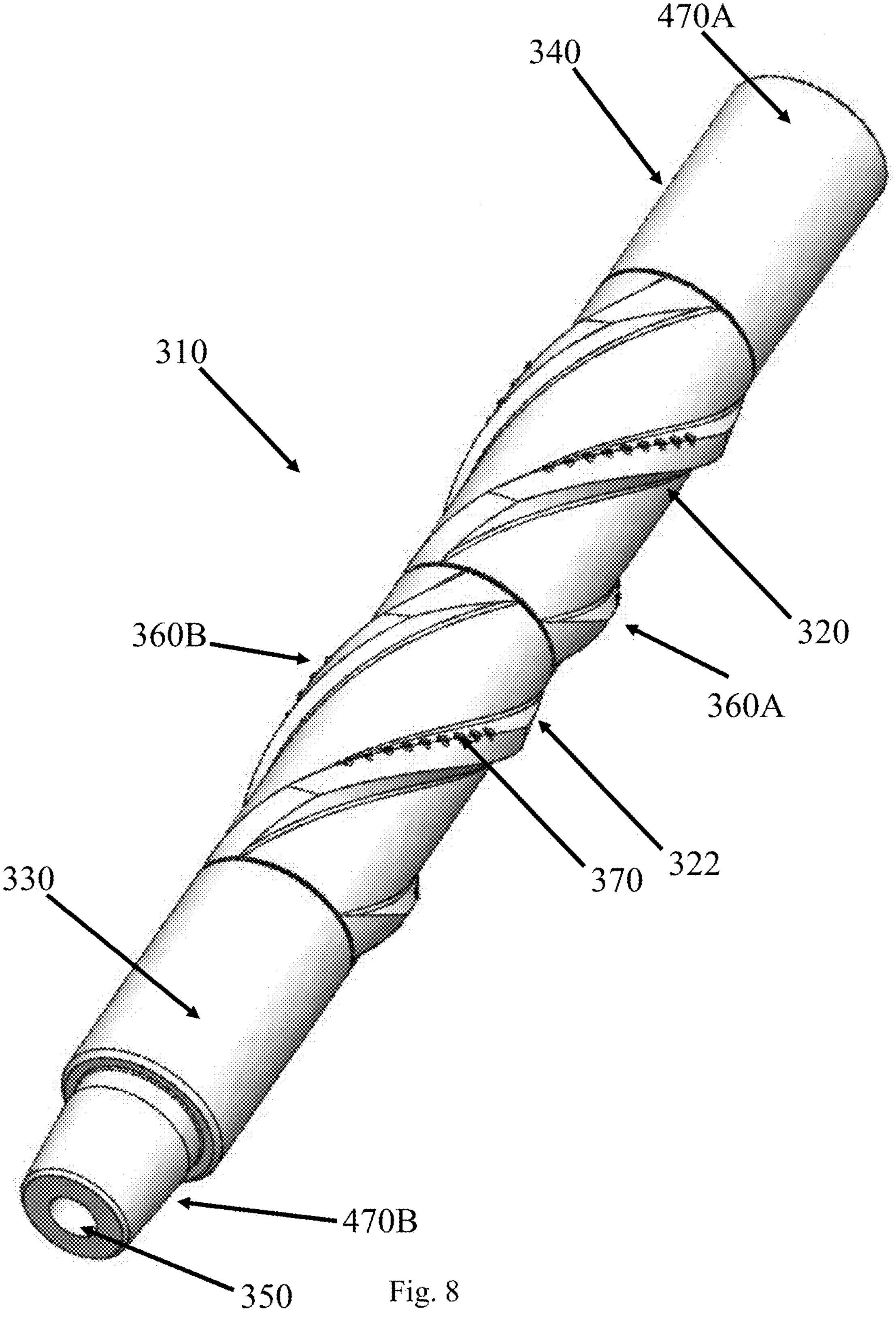
FIG. 8 is a perspective view of an embodiment of a downhole reaming tool with two adjacent sleeves.

FIG. 8 is a perspective view of an embodiment of a downhole reaming tool with two sleeves. In this embodiment, the reamer 310 has a downhole end 330 and an uphole end 340 with an interior passageway 350 along the longitudinal axis of the reamer. The reamer 310 has a first rotating sleeve 320 and a second rotating sleeve 322. Each sleeve has various reamer blades 360A, 360B with teeth 370 or cutters such as polycrystalline diamond compact (PDC) cutters. At the uphole end 340 and the downhole end 330 and of the tool are, in a preferred embodiment, API connections 470A (internal) and 470B respectively to run the tool in the drill string. Other connections, including non-API connections, may be used as desired or appropriate.

Figure 9:
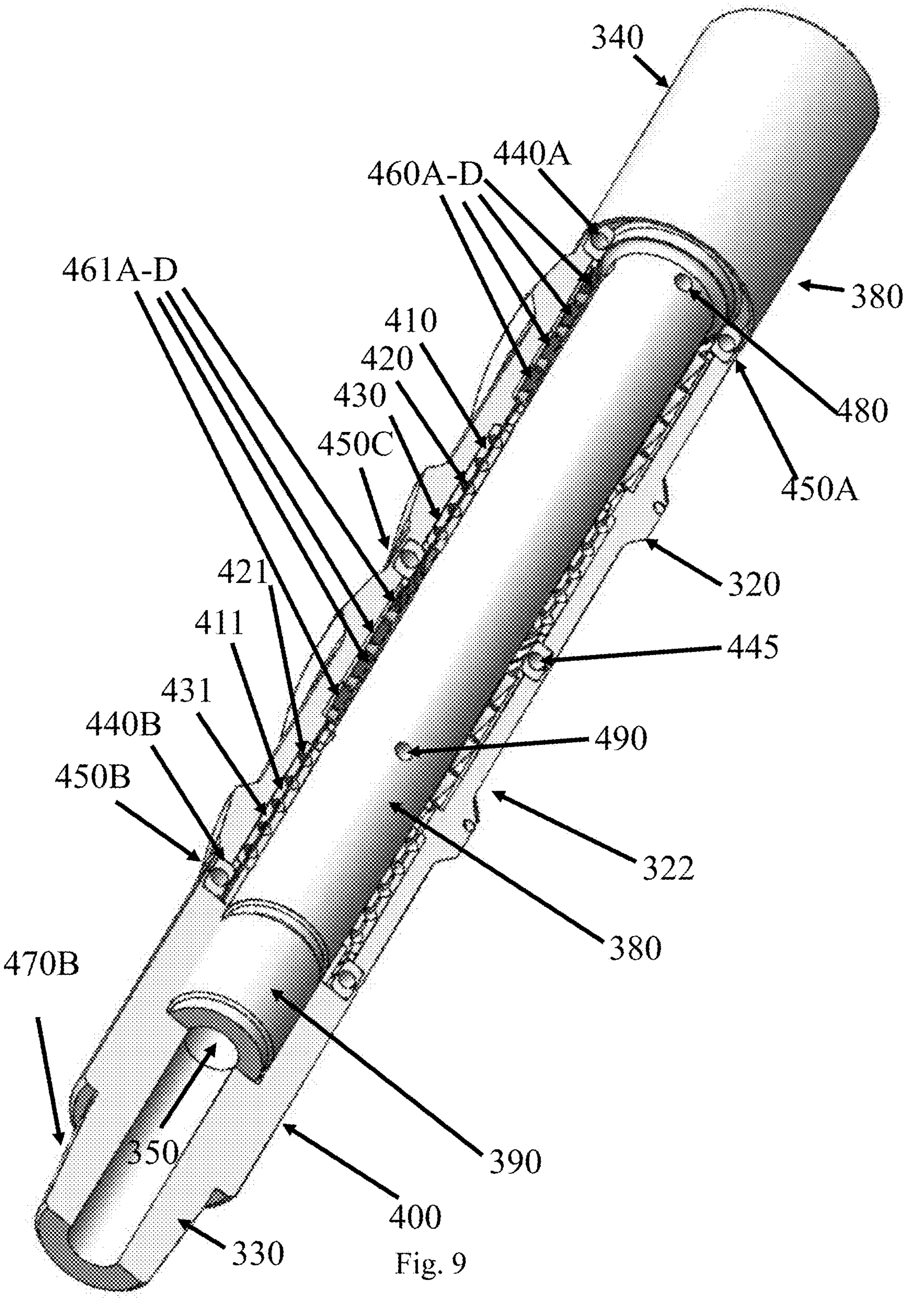
FIG. 9 is a partial cutaway perspective view of an embodiment of a downhole reaming tool.
Figure 10:
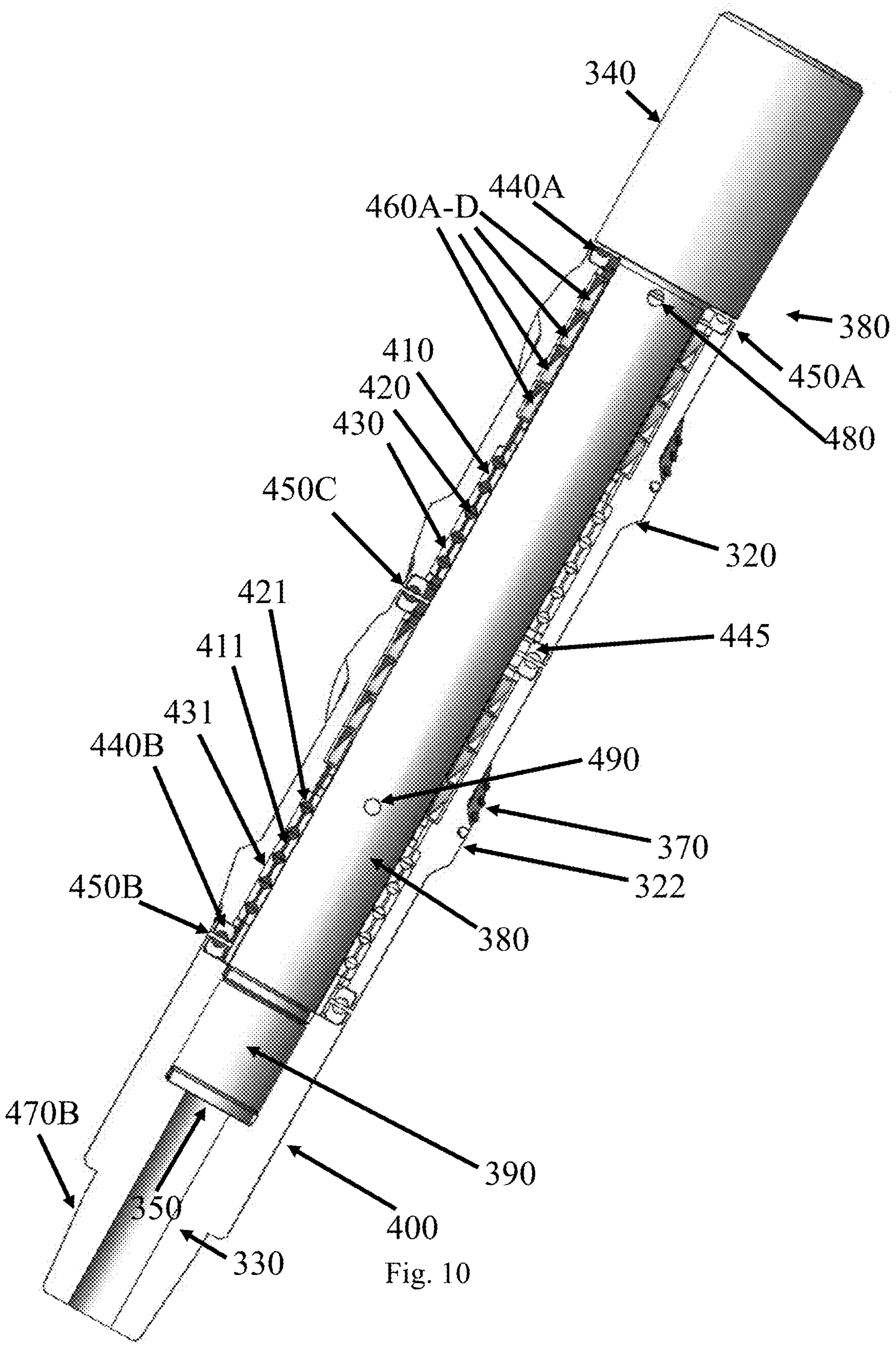
FIG. 10 is a partial cutaway view of an embodiment of a downhole reaming tool.
Figure 11:
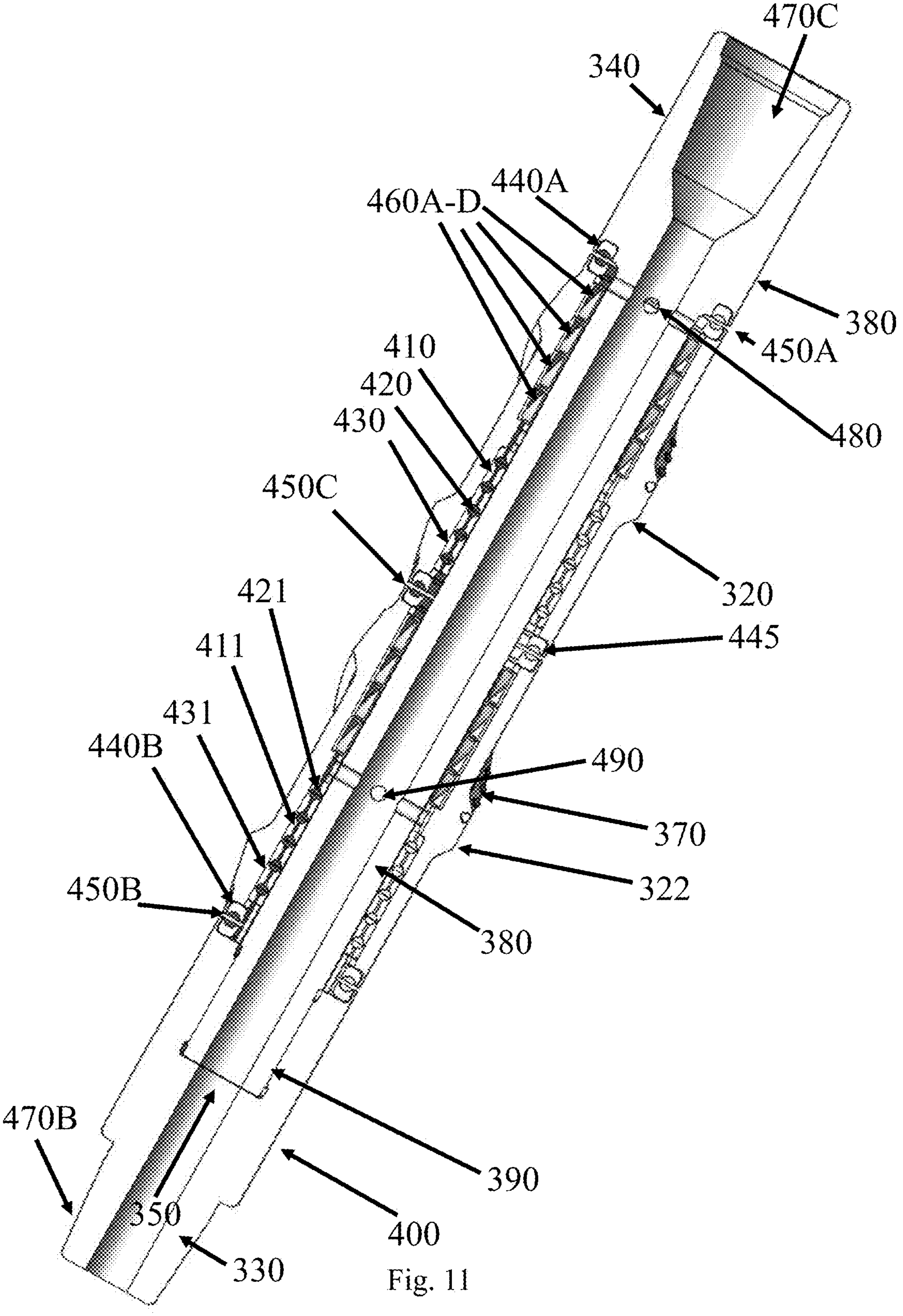
FIG. 11 is a cross-sectional view of an embodiment of a downhole reaming tool.

FIGS. 9-11 are various cutaway and perspective views of embodiments of a downhole reaming tool with two sleeves. The uphole end 340 and the downhole end 330 of the tool have, in a preferred embodiment, API connections 470A and 470B respectively. The uphole end 340 is part of the tension mandrel 380. The downhole end 330 is part of the lower housing 400. A threaded connection 390 joins the tension mandrel 380 to the lower housing 400.

At the uphole end 340 an axial thrust bearing housing 440A holds upper axial thrust bearings (not shown). The upper axial bearings support the axial load of the first sleeve 320 and thus facilitate rotation of the second sleeve 322 by reducing the binding effect of forces compressing the first sleeve 320 into tension mandrel 380 during the operation of the reamer. Likewise at the downhole end 430, an axial thrust bearing housing 440B holds lower axial thrust bearings (not shown). The lower axial bearings support the axial load of the second sleeve 322 and thus facilitate rotation of the second sleeve 322 by reducing the binding effect of forces compressing the second sleeve 322 into lower housing 400 the during operation of the reamer. A middle axial thrust bearing housing 445 holds a middle axial thrust bearing (not shown) that facilitates the rotation of the first and second sleeves 320 & 322 against the other.

Figure 11A:
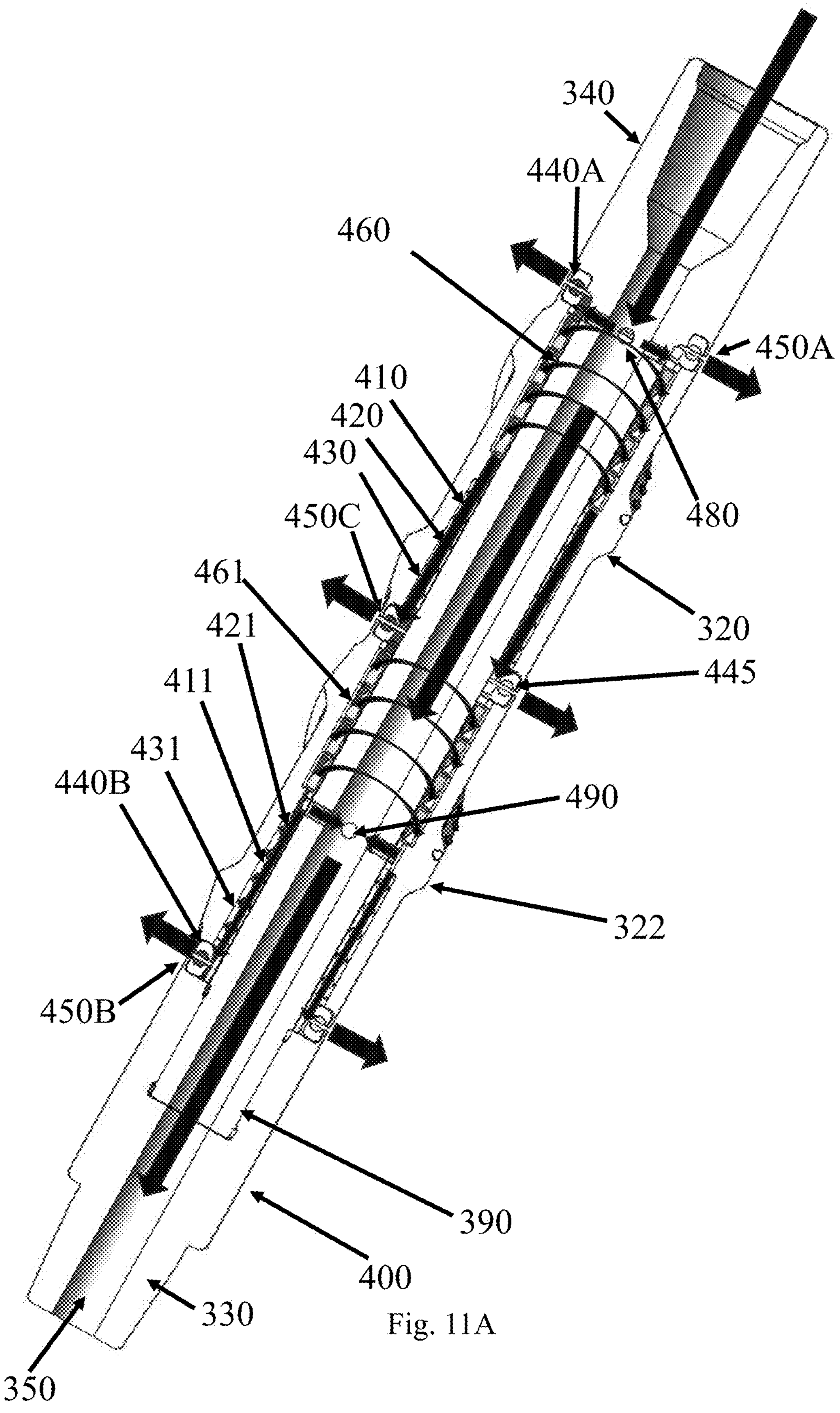
FIG. 11A depicts a mud flow path for an adjacent two-sleeve embodiment of a downhole reaming tool.

The flow of mud through the embodiments in FIGS. 9-11 is similar to FIGS. 2-7 and described in greater detail in FIG. 11A. In FIGS. 9-11, the interior passageway 350 allows for mud to be pumped through the tool from the uphole end 440 to the downhole end 430. The interior passageway 350 portion of the tension mandrel 380 has mud inlets 480. The mud inlets 480 permits a portion of mud to flow into the various bearing housings (e.g., 440A-D and 430-431) to lubricate and/or cool the various bearings. Some portion of the pumped mud may escape from the tool via the mud outlets (e.g., 450A-D).

A portion of the mud may also flow from the mud inlets 480 into a first mud turbine 460 having several mud turbine channels 460A-D The first mud turbine 460 may be connected to the first sleeve 320, for example by welding or bolts, or in some embodiments, the first mud turbine in an integral part of the first sleeve 320. The flow of the mud through the first mud turbine channels 460A-D causes the first mud turbine 460, and thus the first sleeve 320, to rotate around the longitudinal axis of the tool. This mud-powered rotation facilitates the reaming of a bore hole by the cutters or teeth 370 on the first sleeve 320. The second mud turbine 461 may operate in a similar manner with respect to the second sleeve 322.

Radial bearings (not shown) may be present in a radial bearing cavity 420 that is part of a radial bearing housing 430 with respect to the first sleeve 320. The radial bearings support the radial load of the first sleeve 320 and thus facilitate the rotation of the first sleeve 320 around the tension mandrel 380 during operation. Likewise with respect to the second sleeve 322, radial bearings (not shown) may be present in a radial bearing cavity 421 that is part of a radial bearing housing 431. The radial bearings support the radial load of the second sleeve 320 and thus facilitate the rotation of the second sleeve 322 around the tension mandrel 380 during operation.

In FIG. 9, the first and second sleeves 320 and 322 rotate around the tension mandrel 480. In some embodiments, the tension mandrel 480 is long enough so that the first sleeve 320 rotates around the tension mandrel 480 but the second sleeve 322 rotates around the lower housing 400.

In some embodiments the tension mandrel 380 is short enough such that the first and second sleeves rotate around the lower housing 400. In some embodiments, the tension mandrel 480 is long enough so that the first sleeve 320 rotates around both the tension mandrel 480 and the lower housing 400. In some embodiments, the tension mandrel 480 is long enough so that the second sleeve 322 rotates around both the tension mandrel 480 and the lower housing 400.

FIG. 11A depicts the mud flow for an adjacent two-sleeve embodiment of a downhole reaming tool as shown in FIG. 11. As discussed above, mud may be pumped by a mud pump (not shown) through a drill string. When installed on a drill string, the reaming tool permits passage of the mud from the upper end 340 to the lower end 330. The mud is pressurized by the mud pump and gravitational forces and pumped in such large volumes that the flow of mud may be used as a downhole power source for the first and second mud turbines 460 and 461.

The interior passageway 350 portion of the tension mandrel 380 has mud inlets 480 that allow mud to pass through the tension mandrel. The mud inlets 480 permit mud to flow into a mud path that may include an axial thrust bearing housing 440A, allowing for the flow of mud to lubricate and/or cool the axial thrust bearing. Some portion of the pumped mud that enters the mud inlets 480 may pass through the axial thrust bearing housing 440A and escape from the mud outlets 450A-B.

Some portion of the pumped mud that enters the mud inlets 480 may pass through the first mud turbine 460. The first mud turbine 460 has several mud turbine channels 460A-D (shown in FIG. 11). The first mud turbine 460 may be connected to the first sleeve 320, for example by welding or bolts, or in some embodiments, the mud turbine in an integral part of the first sleeve 320. The flow of the mud through the mud turbine channels 460A-D causes the first turbine 460, and thus the first sleeve 320, to rotate around the longitudinal axis of the tool. This mud-powered rotation facilitates the reaming of a bore hole by the cutters or teeth 470 on the first sleeve 320.

After passing through the mud turbine 460 the mud travels through a mud passage 410 and into the bearing cavities (e.g., item 420) to lubricate and/or cool the radial bearings in the radial bearing housing 430. Thereafter, the mud may flow from the radial bearing housing 430 into the middle axial thrust bearing housing 445 to cool and/or lubricate the middle radial thrust bearing. Thereafter, a portion of the mud may exit the tool through a mud outlet (e.g., 450C).

The other portion of the mud may pass through the second mud turbine 461. The second mud turbine 461 has several mud turbine channels 461A-D (shown in FIG. 11). The second mud turbine 461 may be connected to, and rotate, the second sleeve 322 as described with respect to the first sleeve 320 above.

After passing through the second mud turbine 461, some of the pumped mud may exit back into the interior passageway 350 by way of the mud return/bypass outlets 490 and rejoin the mud flowing through interior passageway 350 of the tool. Some of the mud, having passed through the second mud turbine 461 may travel instead through a mud passage 411 and into the bearing cavities (e.g., item 421) to lubricate and/or cool the radial bearings in the radial bearing housing 431. Thereafter, the mud may flow from the radial bearing housing 431 into the lower axial thrust bearing housing 440B to cool and/or lubricate the lower radial thrust bearing. Thereafter, mud may exit the tool through the a mud outlet (e.g., 450B).

Figure 12:
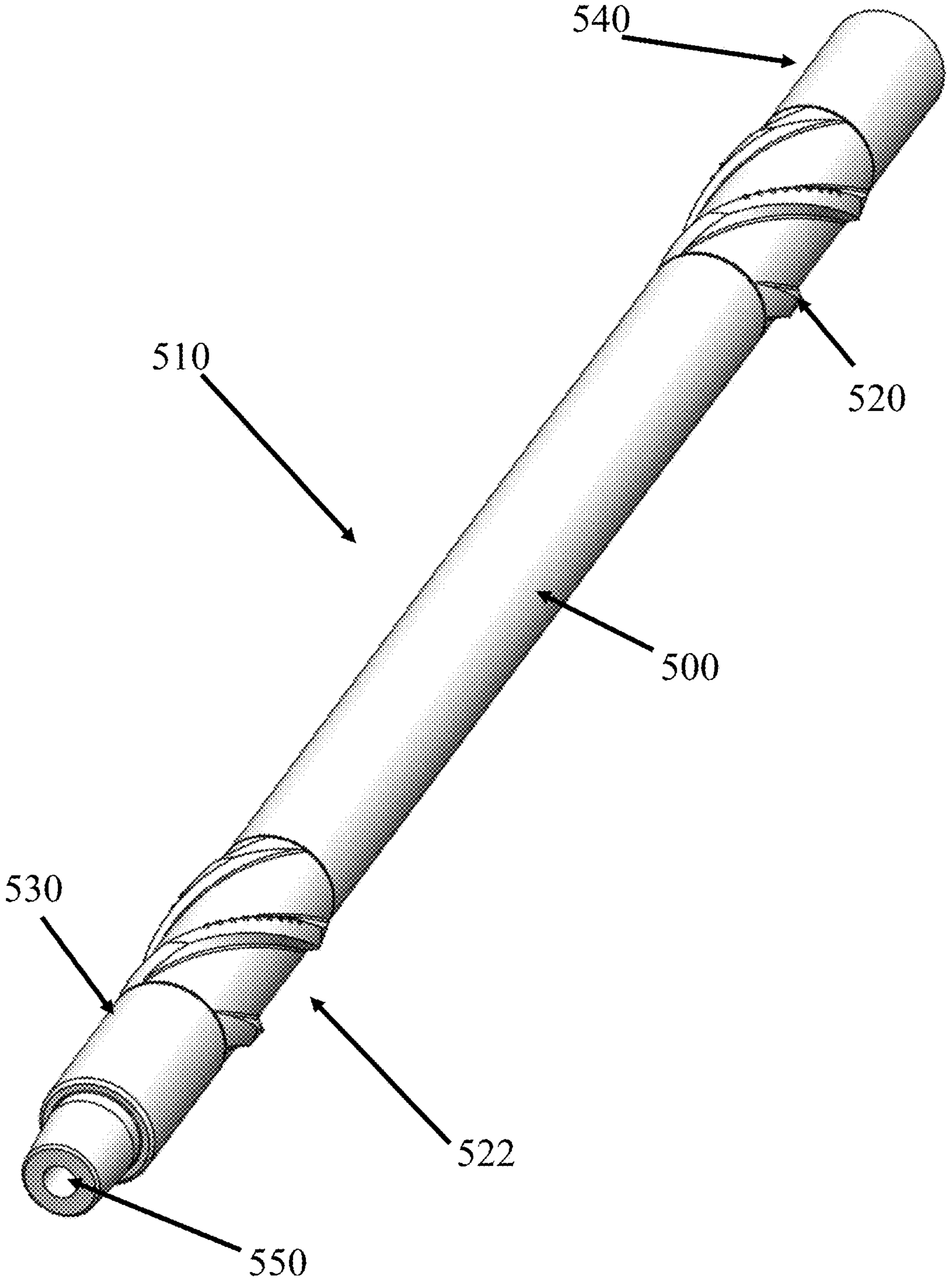
FIG. 12 is a perspective view of an embodiment of a downhole reaming tool with two sleeves separated by a spacer.
Figure 13:
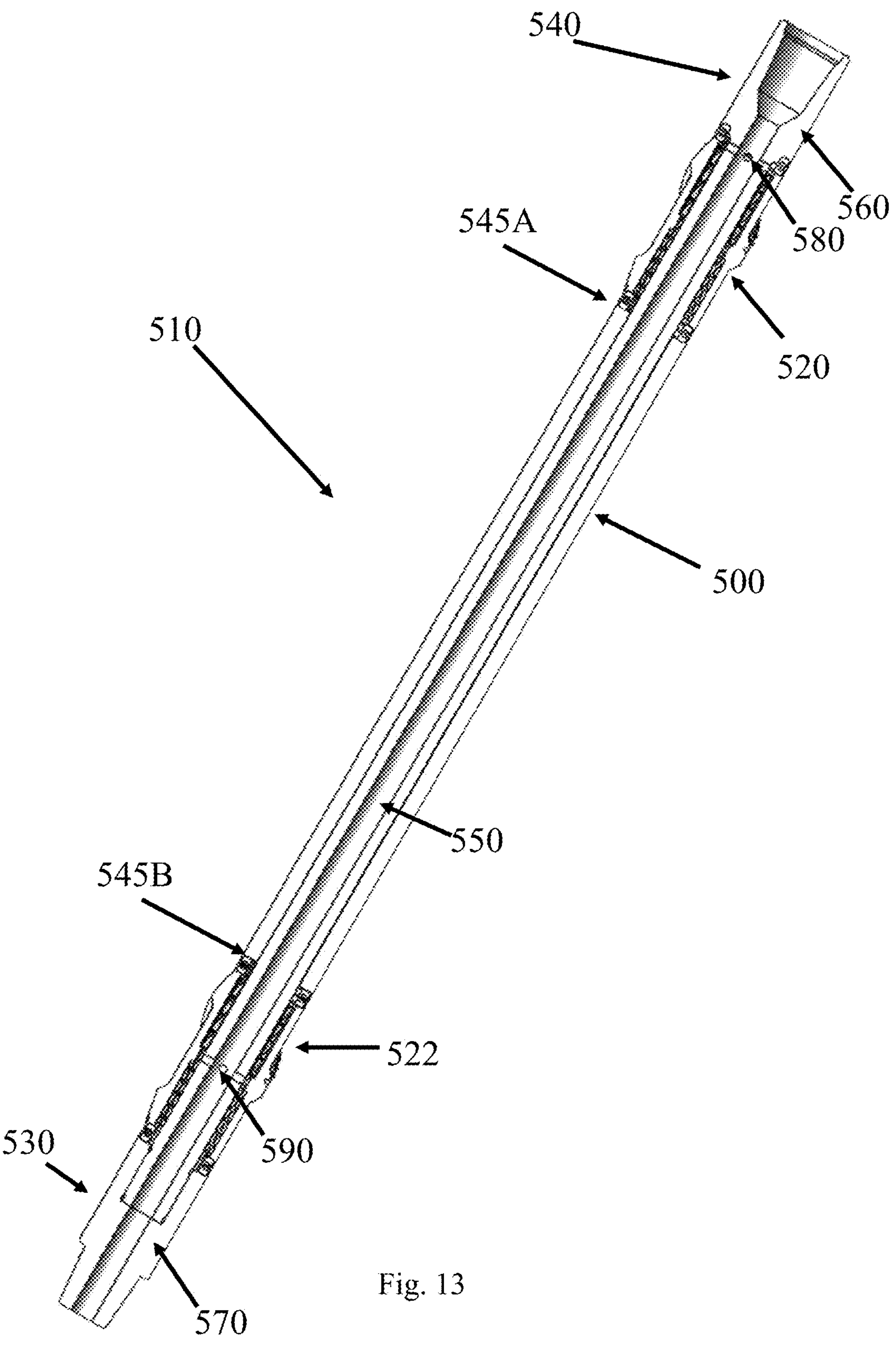
FIG. 13 is a cross-sectional view of an embodiment of a downhole reaming tool with two sleeves separated by a spacer.

FIG. 12 is a perspective view, and FIG. 13 is a cross-sectional view, of another embodiment of a two-sleeve downhole reaming tool 510. The tool has a first sleeve 520 and a second sleeve 522. The two sleeves are separated by a spacer 500. The tool 510 has an uphole end 540 and a downhole end 530. The tool 510 operates in a similar manner and with similar components having similar depictions as the tool displayed in FIG. 9, except that a spacer 500 divides the first sleeve 520 from the second sleeve 522. Axial thrust bearing housings 545A & 545B each hold an axial thrust bearing (not shown) that facilitates the rotation of the first and second sleeves 520 and 522 against the spacer 500. Mud inlets (e.g., 580) and mud return/bypass outlets (e.g., 590) are present. The tension mandrel 560 connects to the lower housing 570. In some embodiments, mud flows between the inner diameter of the spacer 500 and the outer diameter of the tension mandrel 560. In other embodiments, additional mud inlets and outlets (e.g., an additional mud inlet located close to item 545B, and an additional mud return/bypass outlet located close to item 545A) provide for the flow of mud for each mud turbine.

Figure 14:
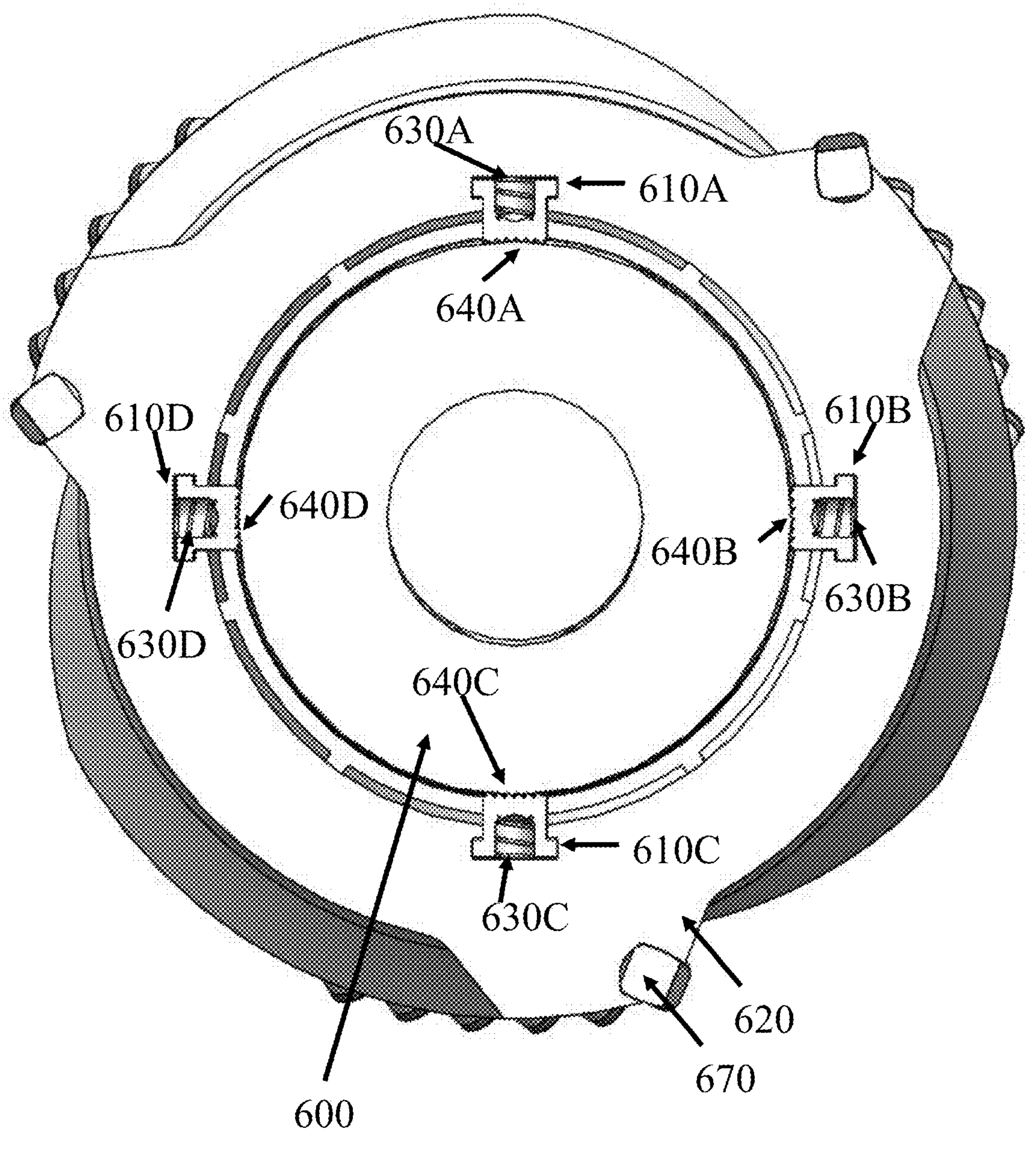
FIG. 14 is a cross-sectional view of an embodiment of a downhole reaming tool showing a set of spring-loaded anti-rotation teeth.

FIG. 14 is a cross-sectional view of an embodiment of a downhole reaming tool showing an anti-rotation feature compatible with the sleeves shown in FIGS. 1, 8, and 12. Anti-rotation teeth 610A-D are pressed into the tension mandrel 600 by springs 630A-D. The anti-rotation teeth have directional serrations 640A-D that permit the sleeve 620 to rotate in one direction freely so that the teeth 670 may ream or cut, but in the other direction, the serrations 640A-D on the teeth 610A-D restrict (e.g., resist or stop) the rotation of the sleeve 620. Thus, the anti-rotation feature permits the mud turbine to drive the sleeve 620 in one direction while restricting (e.g., resisting or stopping) rotation in the other. For example, in some embodiments there may be no mud flow through the tool, or insufficient mud flow to rotate the sleeve. In such cases, the sleeve may be able to rotate freely in one direction, unpowered by the mud turbine, but still cut via the rotation of the drill string itself.

Figure 15:
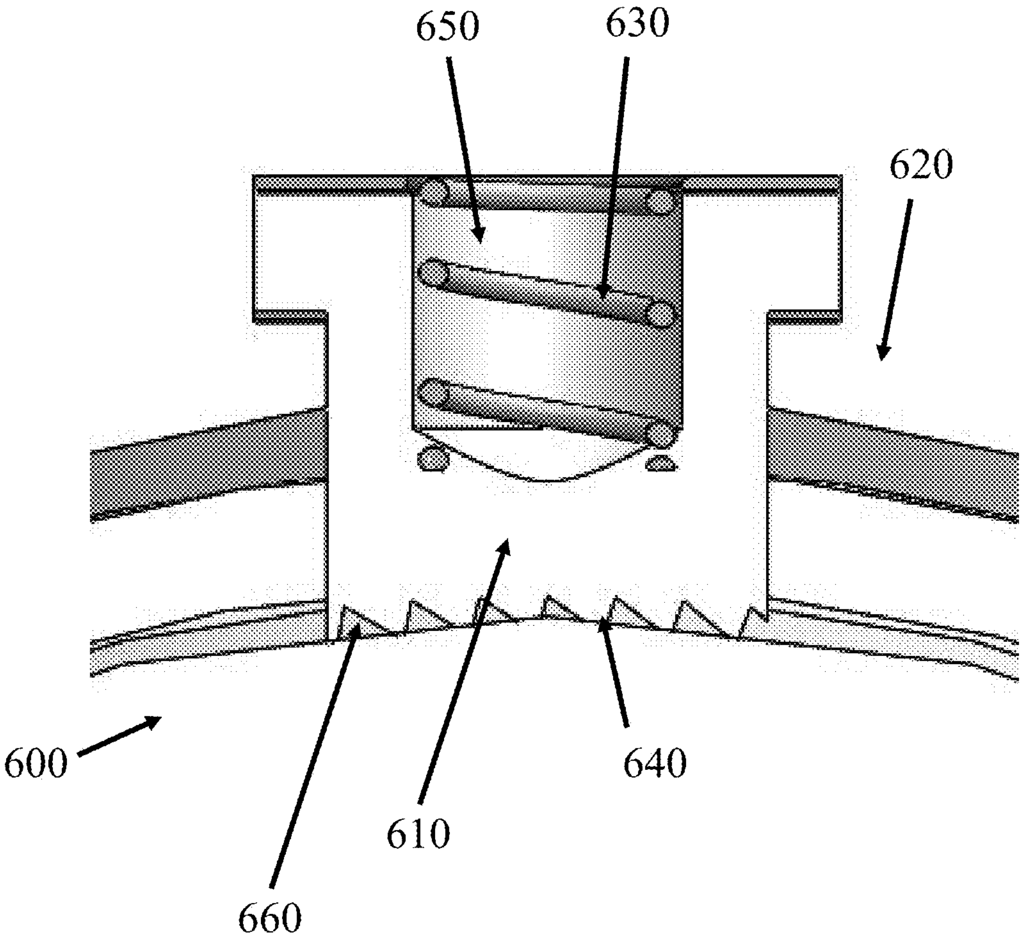
FIG. 15 is a cross-sectional view of an embodiment of a downhole reaming tool showing a close-up view of a spring-loaded anti-rotation tooth.

FIG. 15 is a cross-sectional view of an embodiment of a downhole reaming tool showing a close-up view of a spring-loaded anti-rotation tooth 610. The tooth 610 has a cavity 650 that the spring 630 rests within. The spring presses the tooth 610 into the tension mandrel 600. Directional serrations 640 permit the sleeve 620 to rotate in one direction freely so that the teeth 670 on the sleeve 620 may ream or cut, but in the other direction, the serrations 640 on the teeth 610 resist or stop the rotation of the sleeve 620.

Figure 16:
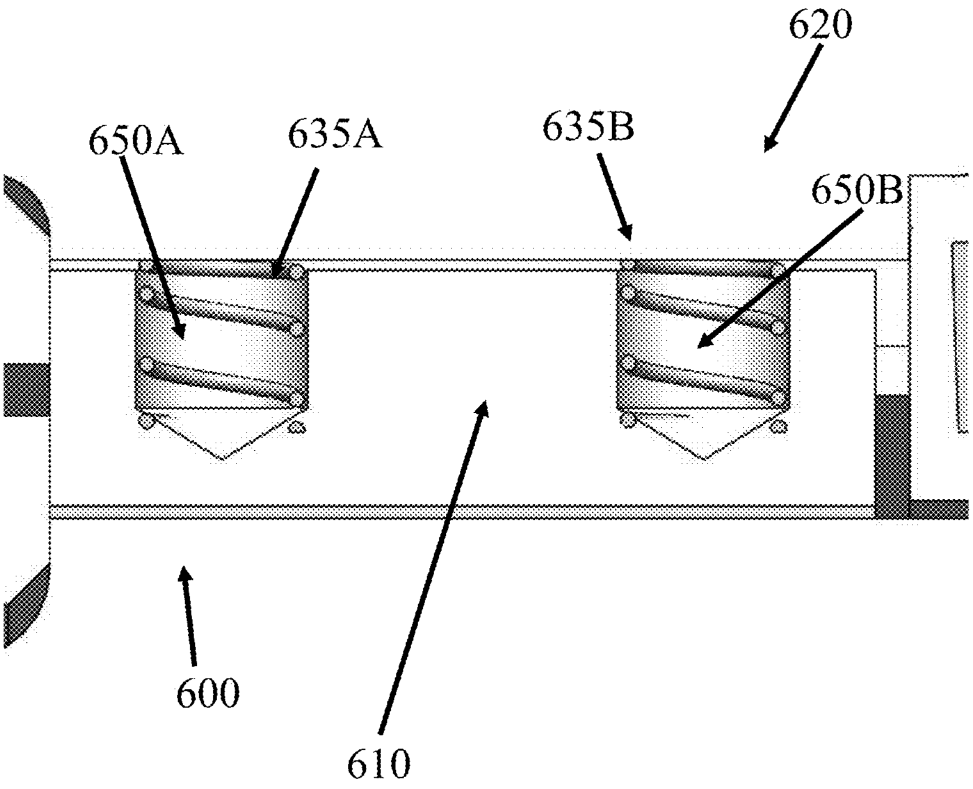
FIG. 16 is a cross-sectional view of an embodiment of a downhole reaming tool showing a pair of spring-loaded anti-rotation teeth.

FIG. 16 is a cross-sectional view (on a different axis than FIG. 15) of an embodiment of a downhole reaming tool showing a pair of spring-loaded anti-rotation teeth. In this embodiment, two springs 635A and 635B in two cavities 650A and 650B press a single tooth 610 into the tension mandrel 600. Serrations 640 are present but not visible in this view. In some embodiments, the tension mandrel 600 may have corresponding serrations 660 that correspond to the tooth serrations to facilitate the resistance or stoppage of the rotation of the sleeve 620.

Figure 17:
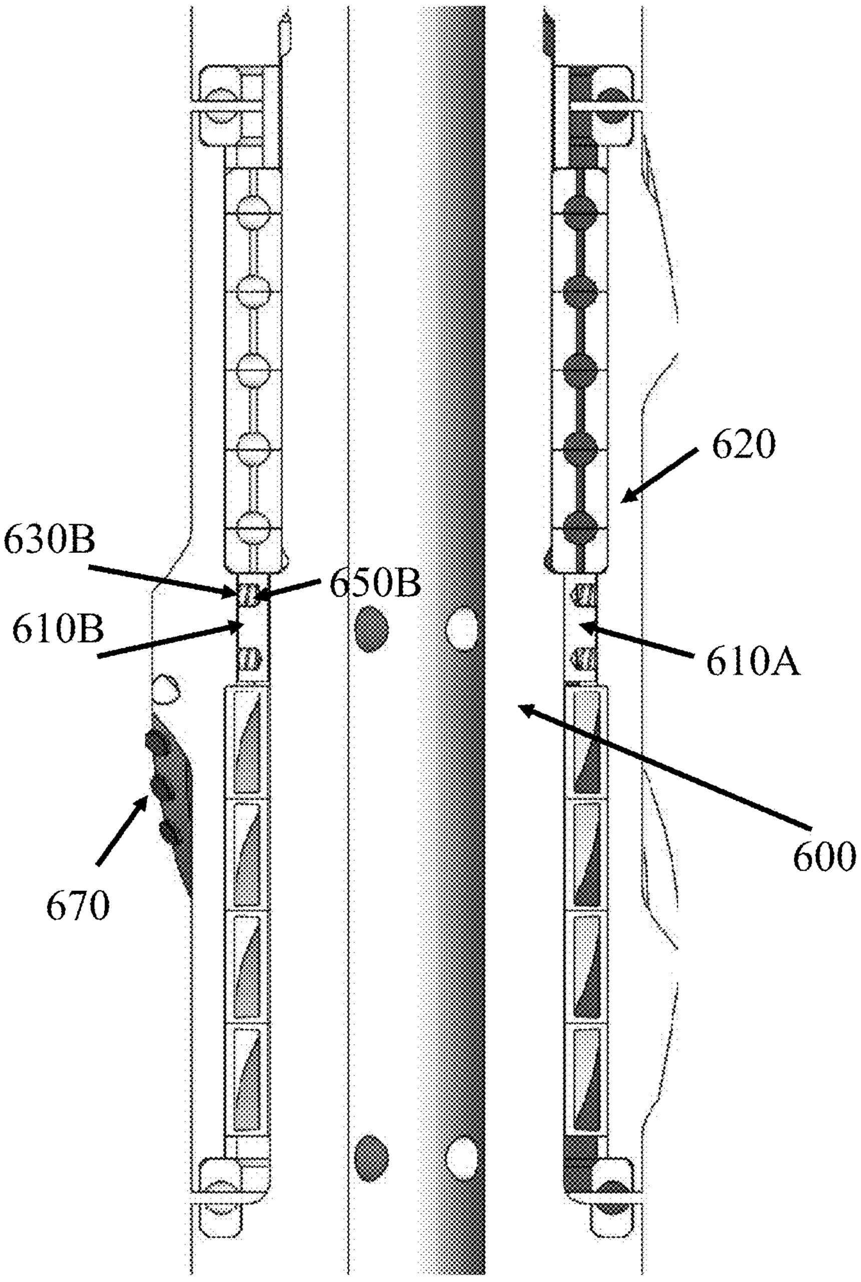
FIG. 17 is a cross-sectional view of an embodiment of a downhole reaming tool showing a two pairs of spring-loaded anti-rotation teeth.
Figure 18:
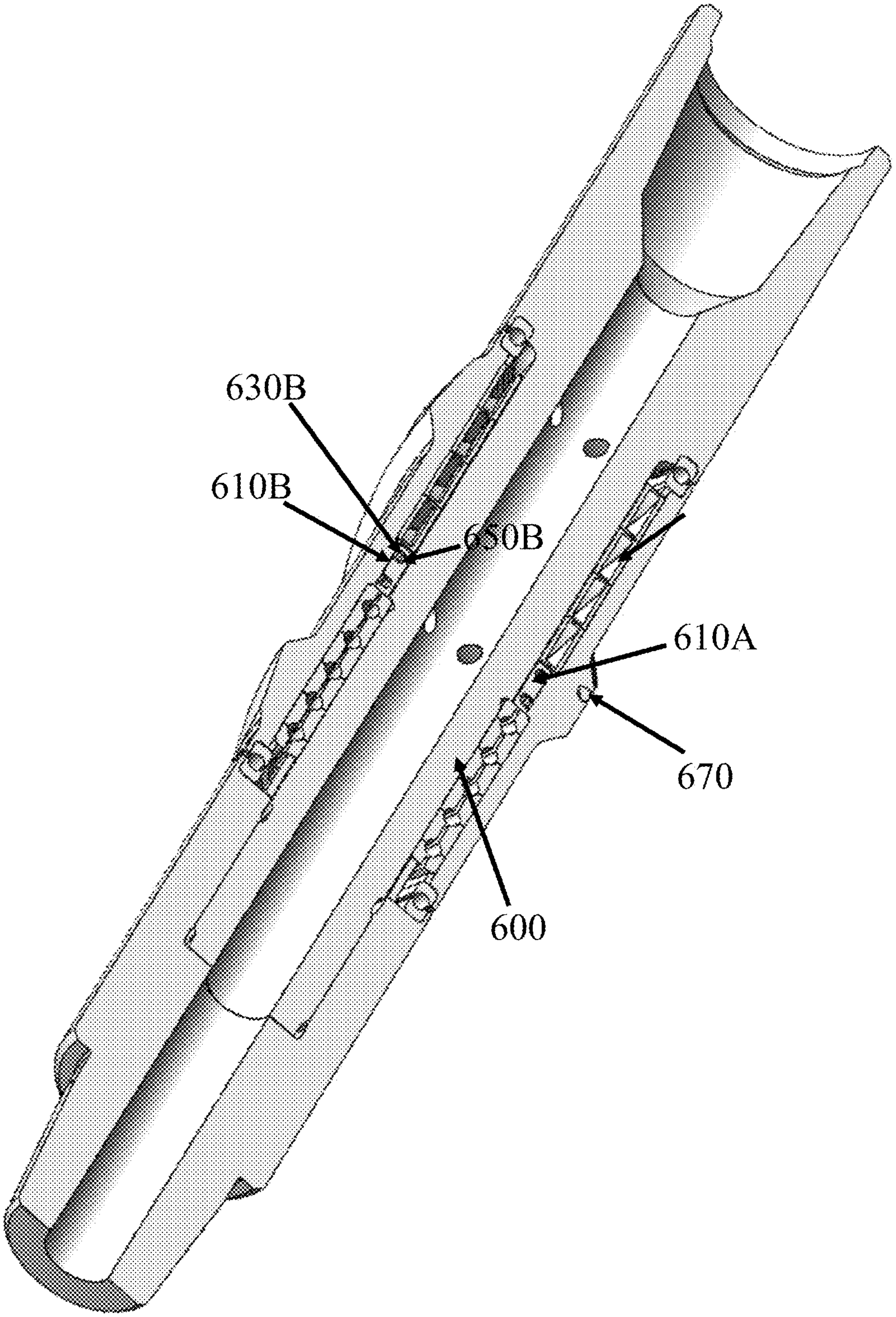
FIG. 18 is a perspective cross-sectional view of an embodiment of a downhole reaming tool showing a two pairs of spring-loaded anti-rotation teeth.

FIG. 17 is a cross-sectional view, and FIG. 18 is a perspective cross-sectional view, of an embodiment of a downhole reaming tool showing a two pairs of spring-loaded anti-rotation teeth. Each tooth 610A and 610B has two cavities, each cavity having a spring. For example, tooth 610B has a cavity 650B with spring 630B. The teeth 610A and 610B function as described with respect to FIGS. 14-16.

Figure 19:
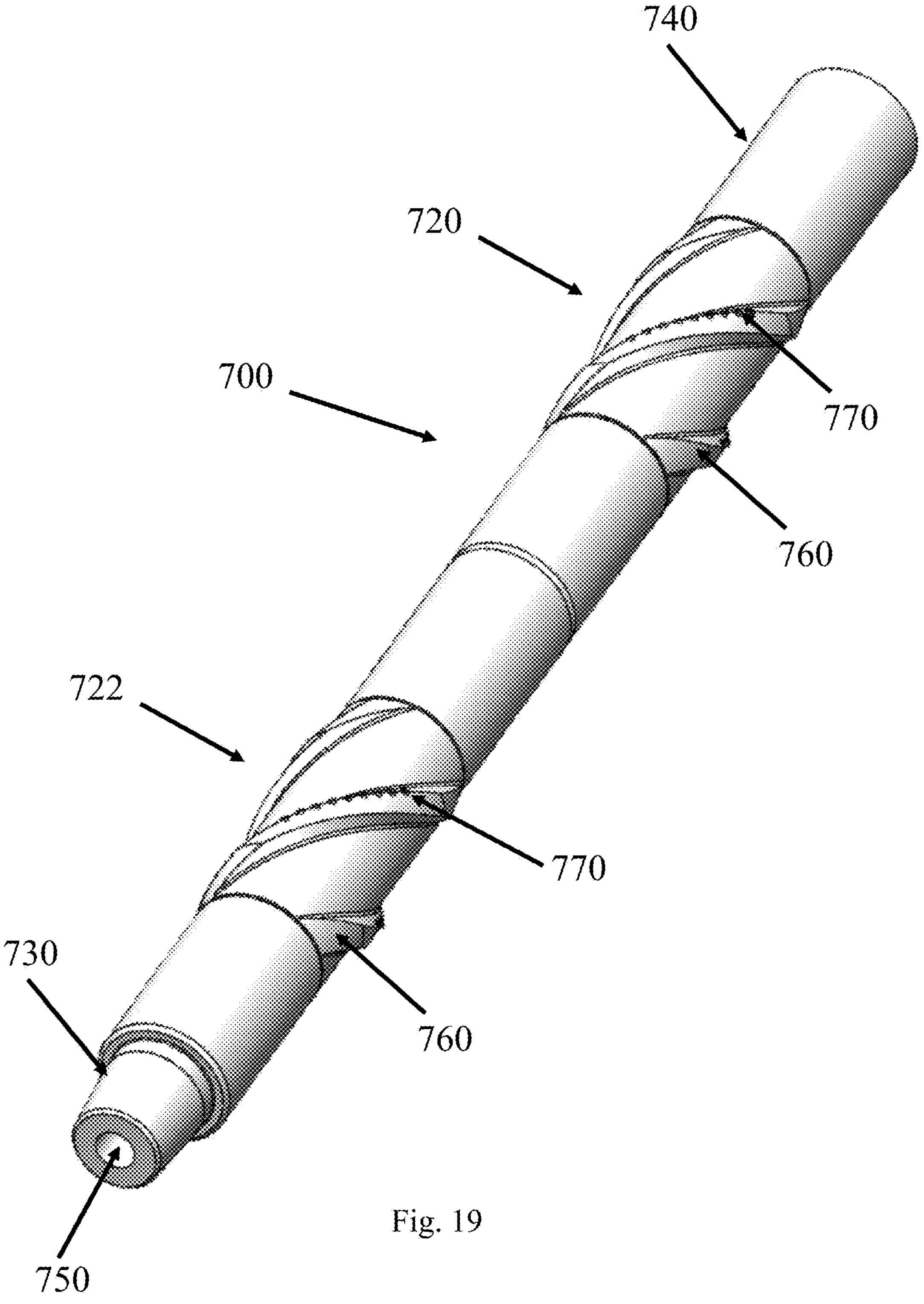
FIG. 19 is a perspective view of an embodiment of two single-sleeve downhole reaming tools joined together with API connections.

FIG. 19 is a perspective view of an embodiment of two single-sleeve downhole reaming tools joined together with API connections. For example, two tools as shown in FIG. 1 with appropriate and corresponding API connections can be combined together to form another embodiment of a two sleeve reaming tool 700. The combined tool has a first sleeve 720 and a second sleeve 722. Each sleeve has reamer blades 760 with teeth (e.g., PDC cutters) 770.

Additionally, in some embodiments, double-sleeve reaming tools such as those shown in FIGS. 8 and/or 12 may be combined together with other double-sleeve reaming tools, or a single sleeve reaming tool as in FIG. 1, to form a combined three sleeve or four sleeve tool.

Figure 20:
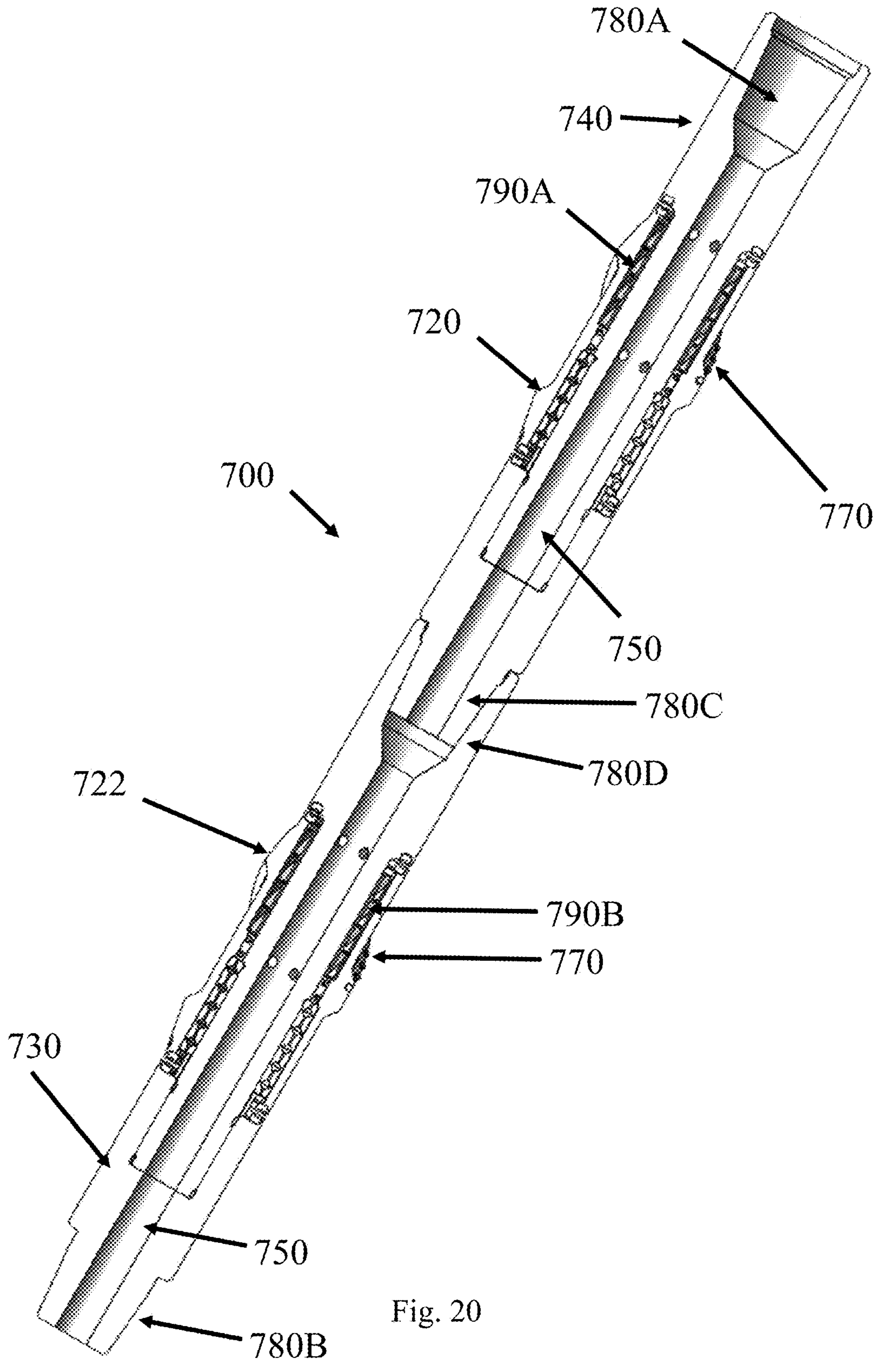
FIG. 20 is a cross-sectional view of an embodiment of two single-sleeve downhole reaming tools joined together with API connections.

FIG. 20 is a cross-sectional view of an embodiment of two single-sleeve downhole reaming tools joined together with API connections 780C and 780D. As in FIG. 19, two tools as shown in FIG. 1 (but here shown using the anti-rotation feature discussed earlier) with appropriate and corresponding API connections are be combined together to form another embodiment of a two sleeve reaming tool 700. The combined tool has a first sleeve 720 and a second sleeve 722. Each sleeve has teeth (e.g., PDC cutters) 770. At the uphole end 740 and the downhole end 730 and of the tool are connections 780A and 780B respectively to run the tool in the drill string. By joining the two tools, a continuous interior passageway 750 allows for mud to flow through the tool and power the mud turbines 790A and 790B of each sleeve.

Figure 2:
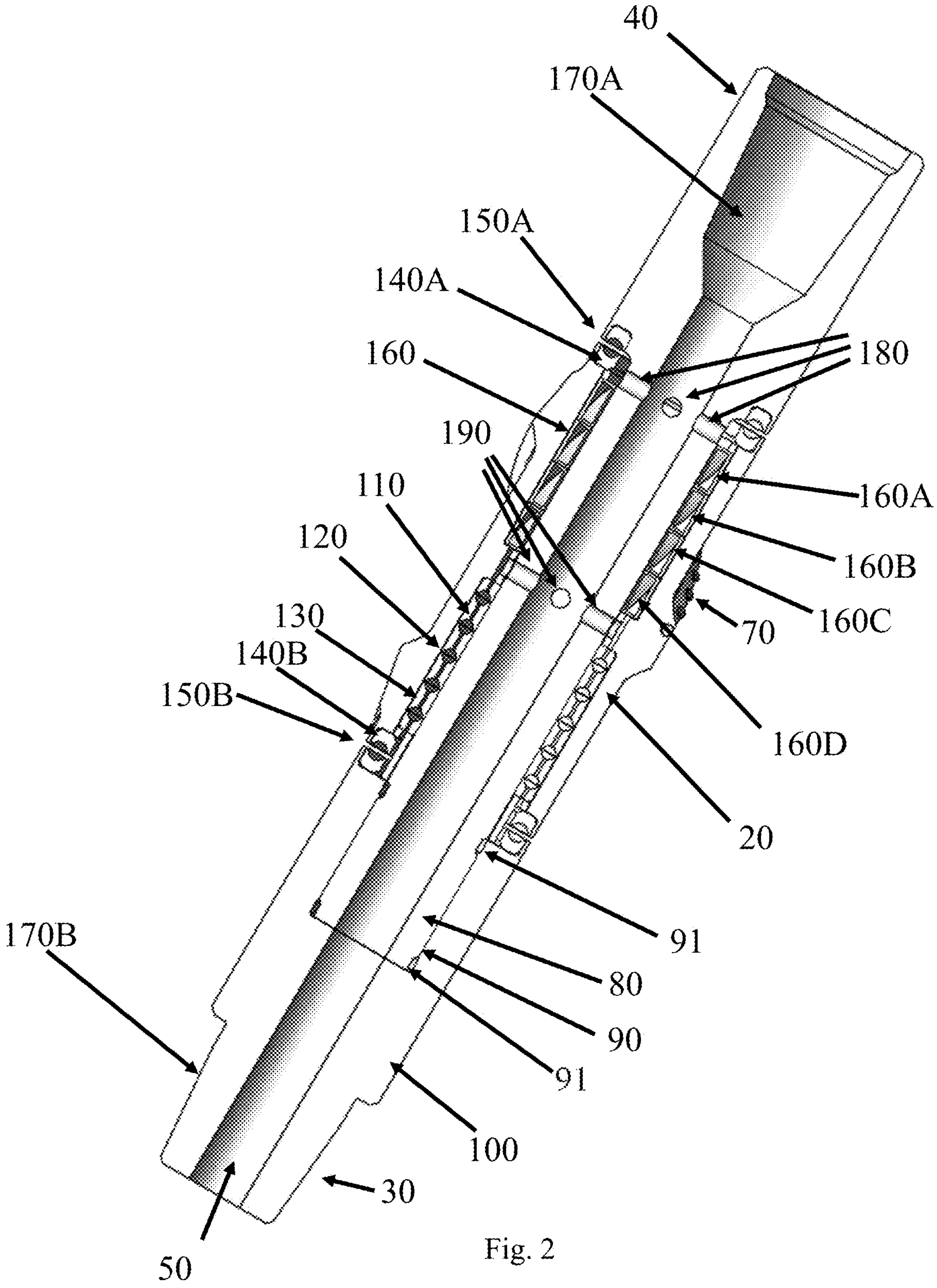
FIG. 2 is a cross-sectional view of an embodiment of a downhole reaming tool.
Figure 3:
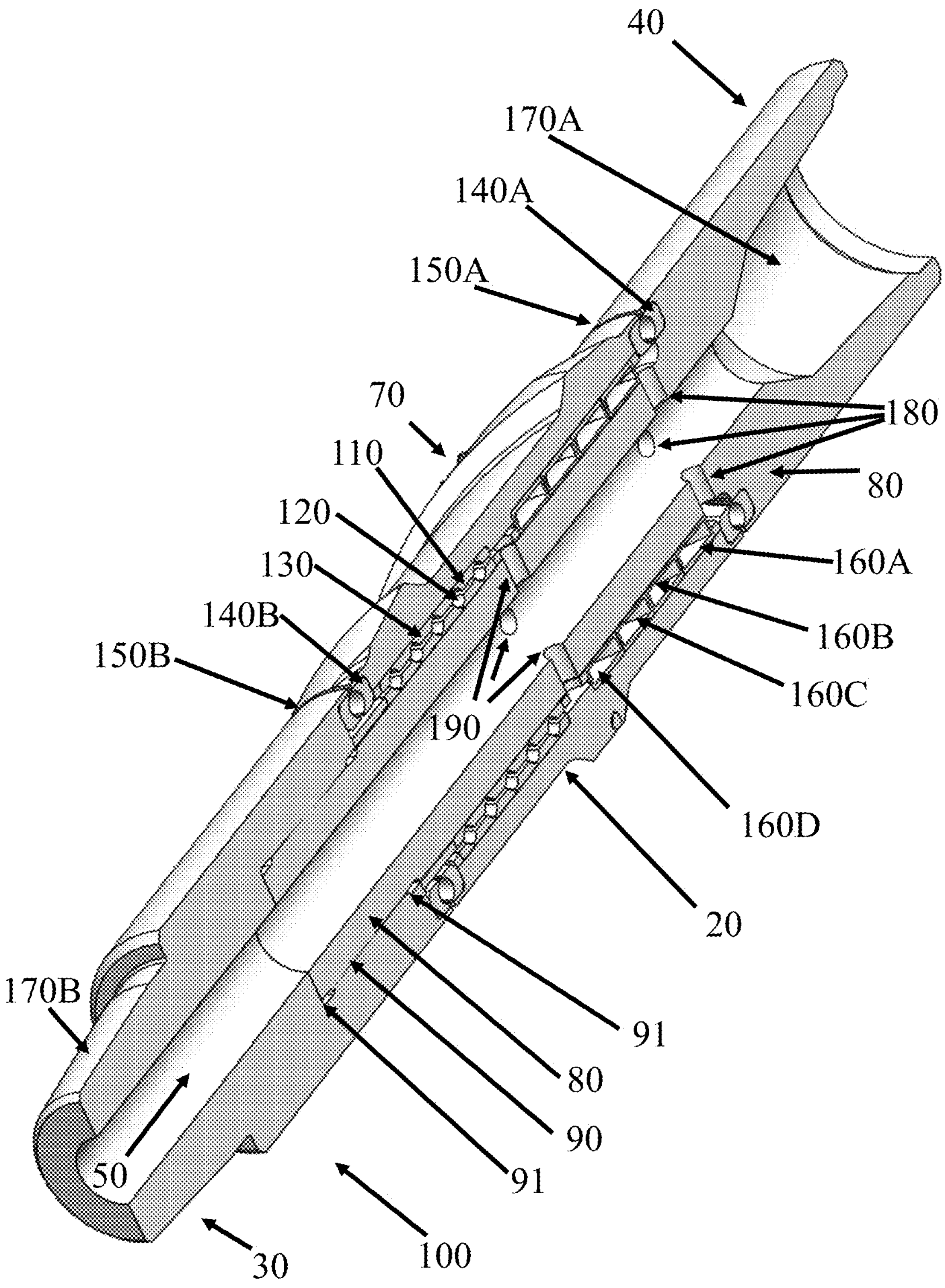
FIG. 3 is a perspective cross-sectional view of an embodiment of a downhole reaming tool.
Figure 4:
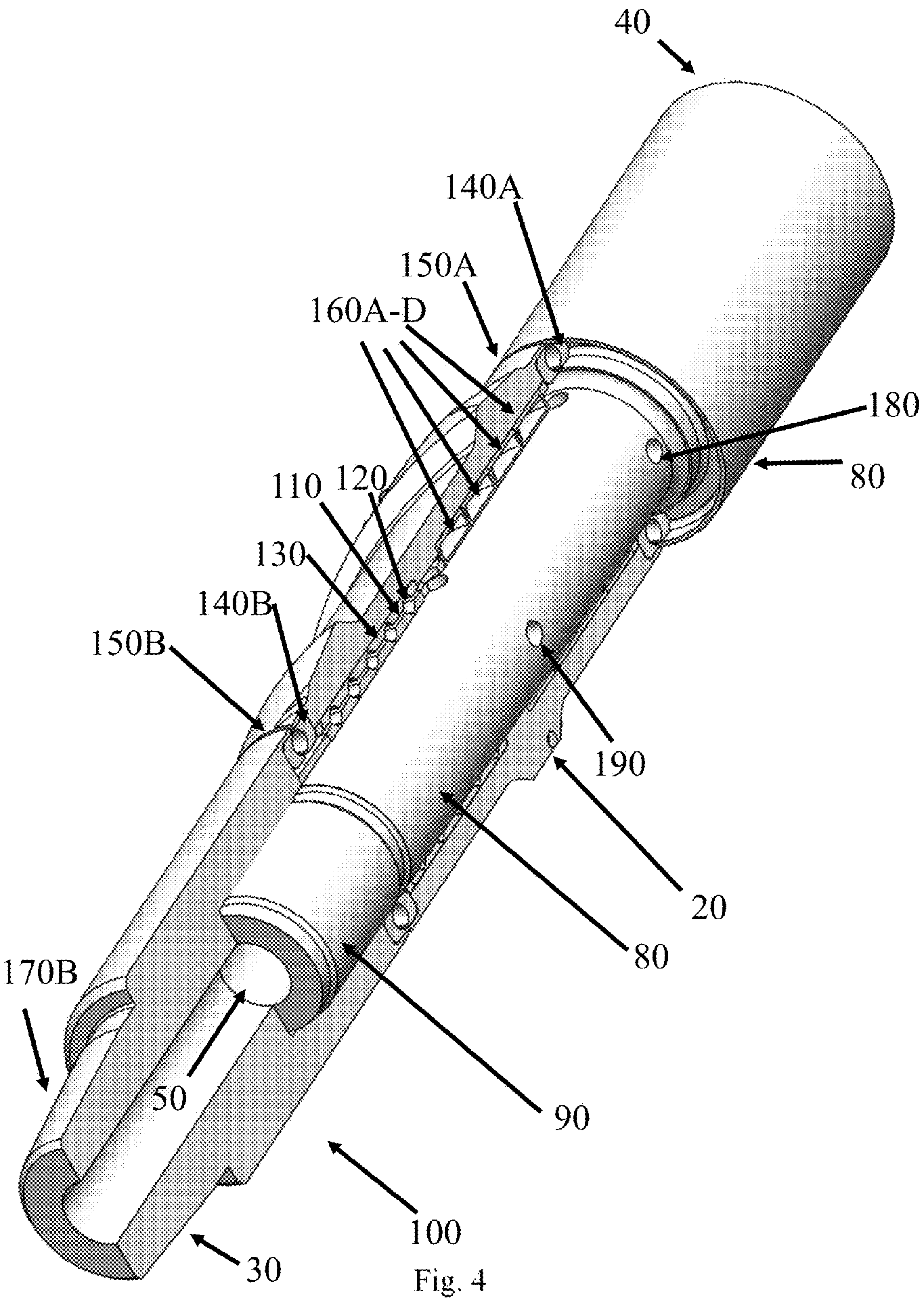
FIG. 4 is a perspective and partial cutaway view of an embodiment of a downhole reaming tool with the tension mandrel shown without cutaway.
Figure 5:
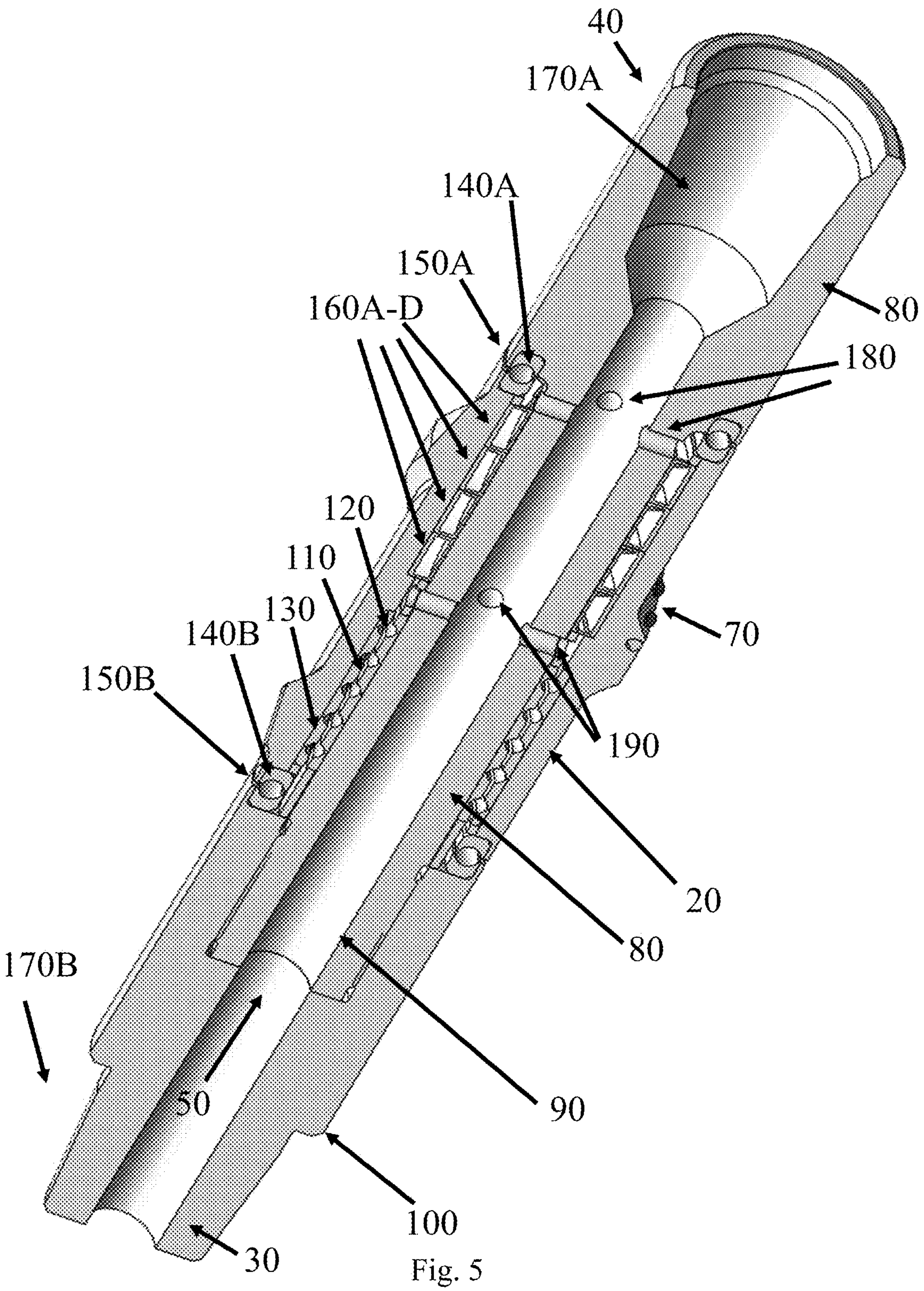
FIG. 5 is a perspective cross-sectional view of an embodiment of a downhole reaming tool.

In some embodiments, for example in FIGS. 2, 9, and 13, no mud turbine or other tool-based source of rotating power (e.g., an electric motor or a mud motor on the tool) is present to rotate the sleeve. Instead, the sleeve is able to freely rotate around the tension mandrel and/or lower housing. This may be particularly desirable, for example, to insert such tools at various intervals along the drill string so as to reduce friction when retracting the drill string from a bending wellbore (and avoid dog-leg concerns). In some embodiments, no tool-based source of rotating power for the sleeve is present but an anti-rotation feature (e.g., FIG. 14) is present to restrict the rotation of the sleeve so as to allow the drill string's rotation to cause the sleeve to ream the wellbore.

In some embodiments, for example in FIGS. 2, 9, and 13, may be made such that no elastomer components are present. This allows the reamer to function in more extreme operating conditions without worrying about the melting or deformation and corresponding loss of function of seals or other features. But nevertheless, elastomer seals may be used where conditions permit with sealed bearings (e.g., sealed axial thrust bearings and sealed radial bearings) instead of mud lubricated bearings.

The various reamers discussed herein may be added as a tool to a bottom hole assembly as desired. For instance, one or more reaming tools as discussed herein may be located above the drilling motor to condition the hole immediately after drilling. Or, they may be located further up the drill string. Some embodiments may also act as a drill string stabilizer.

One advantage of the interior passageway (e.g., items 50, 350, 550) is that unlike many other prior art reamers (e.g., U.S. Pat. No. 10,676,992 to Pearson), the interior passageway herein, in some embodiments, is sufficiently large to permit the passing of a cable and latching tools (sometimes called fishing and/or retrieval tools) through the drill string so that other tools (e.g., measurement while drilling "MWD" tools) below may be retrieved.

One method of reaming a wellbore may comprise the steps of providing a reaming tool (e.g., the tool of FIG. 1, 8, 12, 17, or 19) having an interior passageway along the center of the longitudinal axis of the reaming tool, pumping mud to power a mud turbine on the reaming tool, the mud turbine thereby rotating a rotatable sleeve on the reaming tool, and reaming the wellbore with one or more blades on the rotatable sleeve. In some situations, an additional step may include pumping a cable and latch downhole through the interior passageway of the reaming tool. Restricting the sleeve from rotating in one direction by utilizing spring-loaded anti-rotation teeth may also be done in some circumstances.

Unlike current "reaming while drilling" technology, various embodiments (e.g., FIGS. 1, 8, 12, 17, and 19) of the reaming tool described herein have the ability to ream while slide drilling. In slide drilling, the drill string does not rotate to drill; instead, a downhole motor turns a drilling bit and the hole is drilled in the direction the bit is pointing, which direction is controlled by tool-face orientation. In horizontal drilling applications, various embodiments of the present invention may have a significant advantage for hole cleaning, especially while slide drilling as mud flow will be forced around the blades of the sleeve(s) to the low side of the borehole, thus picking up cuttings and directing them into the mud flow path and carrying them to surface. As such, another method of reaming a wellbore may comprise the steps of providing a reaming tool (e.g., the tool of FIG. 1, 8, 12, 17, or 19) having an interior passageway along the center of the longitudinal axis of the reaming tool, pumping mud to power a mud turbine on the reaming tool, the mud turbine thereby rotating a rotatable sleeve on the reaming tool, and reaming the wellbore with one or more blades on the rotatable sleeve while slide drilling.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. While the invention may be illustrated by using a particular embodiment, this is not and does not limit the invention to any particular embodiment and a person of ordinary skill in the art will recognize that additional embodiments are readily understandable and are a part of this invention.

What is claimed is:

1. A drill string tool comprising:

a lower housing;

a tension mandrel for connection to the lower housing;

an interior passageway at the center of the longitudinal axis of the tool, said passageway spanning the lower housing and the tension mandrel and the full length of the tool;

a rotating sleeve comprising one or more blades;

and a mud turbine for rotating the rotating sleeve.

2. The tool of claim 1 wherein the mud turbine is integral with the rotating sleeve.

3. The tool of claim 1 wherein the mud turbine is directly connected to the rotating sleeve.

4. The tool of claim 1 further comprising radial bearings for supporting a radial load of the sleeve.

5. The tool of claim 1 further comprising an axial thrust bearing between the sleeve and the lower housing for supporting an axial load of the sleeve.

6. The tool of claim 1 further comprising an axial thrust bearing between the sleeve and the tension mandrel for supporting an axial load of the sleeve.

7. The tool of claim 1 wherein the tension mandrel comprises an inlet for mud to flow from the interior passageway towards a mud turbine blade.

8. The tool of claim 1 comprising spring-loaded anti-rotation teeth for restricting a direction of rotation of the rotating sleeve.

9. A drill string tool comprising:

a lower housing;

a tension mandrel for connection to the lower housing;

an interior passageway at the center of the longitudinal axis of the tool, said passageway spanning the lower housing and the tension mandrel and the full length of the tool;

at least a first and a second rotating sleeve, each sleeve comprising one or more blades; and a first and a second mud turbine, said first mud turbine for rotating the first sleeve and the second mud turbine for rotating the second sleeve.

10. The tool of claim 9 wherein the tool has at least one axial load bearing between the first and second sleeve, facilitating the rotation of the first sleeve against the second sleeve.

11. The tool of claim 9 wherein the tension mandrel comprises an inlet for mud to flow from the interior passageway towards a mud turbine blade of the first mud turbine.

12. The tool of claim 9 wherein the tension mandrel comprises a bypass for mud to flow from a turbine blade of the second mud turbine into the interior passageway.

13. A drill string tool comprising:

a lower housing;

a tension mandrel for connection to the lower housing;

an interior passageway at the center of the longitudinal axis of the tool, said passageway spanning the lower housing and the tension mandrel and the full length of the tool;

at least a first and a second rotating sleeve, each sleeve comprising one or more blades;

a spacer between the first and second rotating sleeves; and at least one mud turbine for rotating at least one of the two rotating sleeves.

14. The tool of claim 13 wherein the at least one mud turbine comprises a first and a second mud turbine, said first mud turbine for rotating the first sleeve and the second mud turbine for rotating the second sleeve.

15. The tool of claim 13 wherein the tool has at least one axial load bearing between the first sleeve and the spacer, for facilitating the rotation of the first sleeve against the spacer.

16. The tool of claim 13 wherein the tool has at least one axial load bearing between the second sleeve and the spacer, for facilitating the rotation of the second sleeve against the spacer.

17. The tool of claim 13 wherein the tension mandrel comprises a bypass for mud to flow from a turbine blade of the second mud turbine into the interior passageway.

* * * * *